United States Patent
Li et al.

(10) Patent No.: US 12,200,669 B2
(45) Date of Patent: Jan. 14, 2025

(54) CROSS-CARRIER FEEDBACK WITH SIDELINK CARRIER AGGREGATION

(71) Applicant: QUALCOMM Incorporated, San Diego, CA (US)

(72) Inventors: Qing Li, Princeton Junction, NJ (US); Seyedkianoush Hosseini, San Diego, CA (US); Sony Akkarakaran, Poway, CA (US); Gabi Sarkis, San Diego, CA (US); Junyi Li, Fairless Hills, PA (US); Hong Cheng, Basking Ridge, NJ (US); Ozcan Ozturk, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 239 days.

(21) Appl. No.: 17/446,785

(22) Filed: Sep. 2, 2021

(65) Prior Publication Data

US 2023/0064573 A1  Mar. 2, 2023

(51) Int. Cl.
*H04W 72/044* (2023.01)
*H04L 5/00* (2006.01)

(52) U.S. Cl.
CPC ......... *H04W 72/044* (2013.01); *H04L 5/0055* (2013.01)

(58) Field of Classification Search
CPC ...... H04W 72/044; H04L 5/0055; H04L 1/18; H04L 5/001; H04L 5/0094
See application file for complete search history.

(56) References Cited

U.S. PATENT DOCUMENTS

| | | | | |
|---|---|---|---|---|
| 2013/0100918 | A1* | 4/2013 | Hong | H04L 1/0057 370/329 |
| 2014/0342745 | A1* | 11/2014 | Bhushan | H04W 24/02 455/450 |
| 2018/0013522 | A1* | 1/2018 | Liu | H04L 1/1854 |
| 2018/0302128 | A1* | 10/2018 | Akkarakaran | H04B 7/0421 |
| 2019/0158250 | A1* | 5/2019 | Ang | H04L 5/0046 |
| 2019/0159206 | A1* | 5/2019 | Sun | H04L 5/0053 |
| 2020/0076488 | A1* | 3/2020 | Brunel | H04B 7/063 |
| 2021/0288778 | A1* | 9/2021 | Park | H04L 1/1858 |
| 2021/0321291 | A1* | 10/2021 | Yeo | H04W 28/06 |
| 2022/0124726 | A1* | 4/2022 | Zhao | H04W 72/02 |
| 2022/0150908 | A1* | 5/2022 | Ji | H04L 5/0055 |

(Continued)

*Primary Examiner* — Edan Orgad
*Assistant Examiner* — Malick A Sohrab
(74) *Attorney, Agent, or Firm* — Arun Swain

(57) ABSTRACT

Various aspects of the present disclosure generally relate to wireless communication. In some aspects, a user equipment (UE) may receive a configuration. The configuration may indicate component carriers for sidelink carrier aggregation and parameters associated with cross-carrier feedback. The UE may receive a first transmission block on a first component carrier and a second transmission block on a second component carrier. The UE may transmit a physical sidelink feedback channel (PSFCH) on a third component carrier with the cross-carrier feedback. The cross-carrier feedback may include a set of acknowledgement/negative acknowledgement (ACK/NACK) bits and an indication of an association between each ACK/NACK bit and a corresponding one of the first component carrier, the second component carrier, the first transmission block, or the second transmission block. Numerous other aspects are described.

30 Claims, 16 Drawing Sheets

(56) References Cited

U.S. PATENT DOCUMENTS

2022/0394738 A1\* 12/2022 Yang .................. H04L 1/1864
2023/0269754 A1\*  8/2023 Ye ..................... H04L 1/1812
                                                370/329

\* cited by examiner

CROSS-CARRIER FEEDBACK WITH SIDELINK CARRIER AGGREGATION

FIELD OF THE DISCLOSURE

Aspects of the present disclosure generally relate to wireless communication and to techniques and apparatuses for cross-carrier feedback with sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration, wherein the configuration indicates component carriers for sidelink carrier aggregation and one or more parameters associated with cross-carrier feedback, and wherein the component carriers include a first component carrier, a second component carrier, and a third component carrier. The method may include receiving a first transmission block on the first component carrier and a second transmission block on the second component carrier. The method may include transmitting a physical sidelink feedback channel (PSFCH) on the third component carrier with the cross-carrier feedback, wherein the cross-carrier feedback includes a set of acknowledgement/negative acknowledgement (ACK/NACK) bits and an indication of an association between each ACK/NACK bit, of the set of ACK/NACK bits, and a corresponding one of the first component carrier, the second component carrier, the first transmission block, or the second transmission block.

Some aspects described herein relate to a method of wireless communication performed by a UE. The method may include transmitting a configuration, wherein the configuration indicates component carriers for sidelink carrier aggregation and one or more parameters associated with cross-carrier feedback, and wherein the component carriers include a first component carrier, a second component carrier, and a third component carrier. The method may include transmitting a first transmission block on the first component carrier and a second transmission block on the second component carrier. The method may include receiving a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Some aspects described herein relate to a UE for wireless communication. The UE may include a memory and one or more processors coupled to the memory. The one or more processors may be configured to receive a configuration, wherein the configuration indicates component carriers for sidelink carrier aggregation and one or more parameters associated with cross-carrier feedback, and wherein the component carriers include a first component carrier, a second component carrier, and a third component carrier. The one or more processors may be configured to receive a first transmission block on the first component carrier and a second transmission block on the second component carrier. The one or more processors may be configured to transmit a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Some aspects described herein relate to a UE for wireless communication. The UE may include a memory and one or more processors coupled to the memory. The one or more processors may be configured to transmit a configuration, wherein the configuration indicates component carriers for sidelink carrier aggregation and one or more parameters associated with cross-carrier feedback, and wherein the component carriers include a first component carrier, a second component carrier, and a third component carrier. The one or more processors may be configured to transmit a first transmission block on the first component carrier and a second transmission block on the second component carrier. The one or more processors may be configured to receive a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Some aspects described herein relate to a non-transitory computer-readable medium that stores a set of instructions for wireless communication by a UE. The set of instructions, when executed by one or more processors of the UE, may cause the UE to receive a configuration, wherein the configuration indicates component carriers for sidelink carrier aggregation and one or more parameters associated with cross-carrier feedback, and wherein the component carriers include a first component carrier, a second component carrier, and a third component carrier. The set of instructions, when executed by one or more processors of the UE, may cause the UE to receive a first transmission block on the first component carrier and a second transmission block on the second component carrier. The set of instructions, when executed by one or more processors of the UE, may cause the UE to transmit a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Some aspects described herein relate to a non-transitory computer-readable medium that stores a set of instructions for wireless communication by a one or more instructions that, when executed by one or more processors of a UE, may cause the UE to transmit a configuration, wherein the configuration indicates component carriers for sidelink carrier aggregation and one or more parameters associated with cross-carrier feedback, and wherein the component carriers include a first component carrier, a second component carrier, and a third component carrier. The set of instructions, when executed by one or more processors of the UE, may cause the UE to transmit a first transmission block on the first component carrier and a second transmission block on the second component carrier. The set of instructions, when executed by one or more processors of the one or more instructions that, when executed by one or more processors of the UE, may cause the UE to receive a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Some aspects described herein relate to an apparatus for wireless communication. The apparatus may include means for receiving a configuration, wherein the configuration indicates component carriers for sidelink carrier aggregation and one or more parameters associated with cross-carrier feedback, and wherein the component carriers include a first component carrier, a second component carrier, and a third component carrier. The apparatus may include means for receiving a first transmission block on the first component carrier and a second transmission block on the second component carrier. The apparatus may include means for transmitting a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Some aspects described herein relate to an apparatus for wireless communication. The apparatus may include means for transmitting a configuration, wherein the configuration indicates component carriers for sidelink carrier aggregation and one or more parameters associated with cross-carrier feedback, and wherein the component carriers include a first component carrier, a second component carrier, and a third component carrier. The apparatus may include means for transmitting a first transmission block on the first component carrier and a second transmission block on the second component carrier. The apparatus may include means for receiving a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
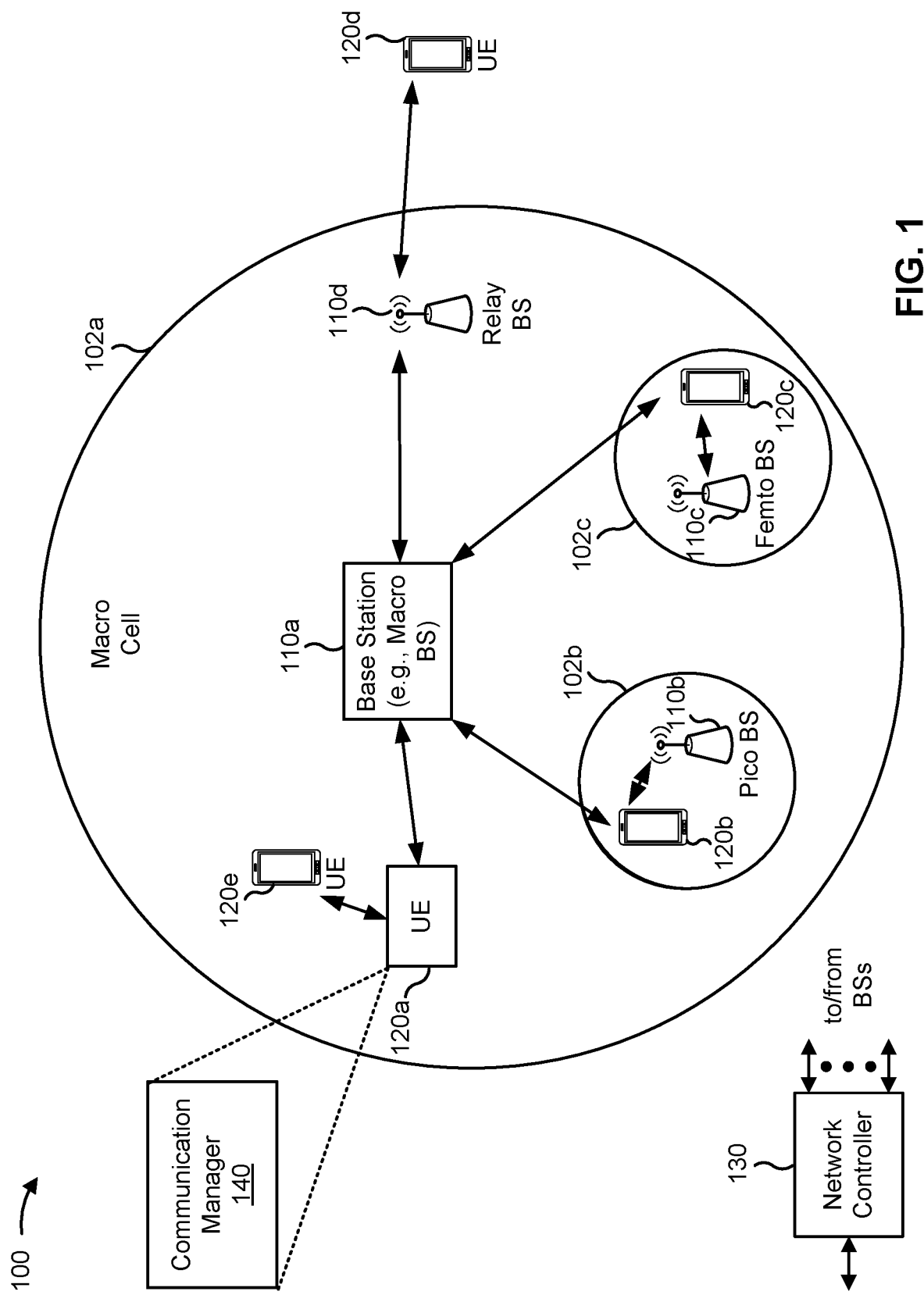
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more processes associated with cross-carrier feedback with sidelink carrier aggregation. Additionally, or alternatively, the communication manager 140 may perform one or more other operations described herein.

As indicated above, FIG. 1 is provided as an example. Other examples may differ from what is described with regard to FIG. 1.

Figure 2:
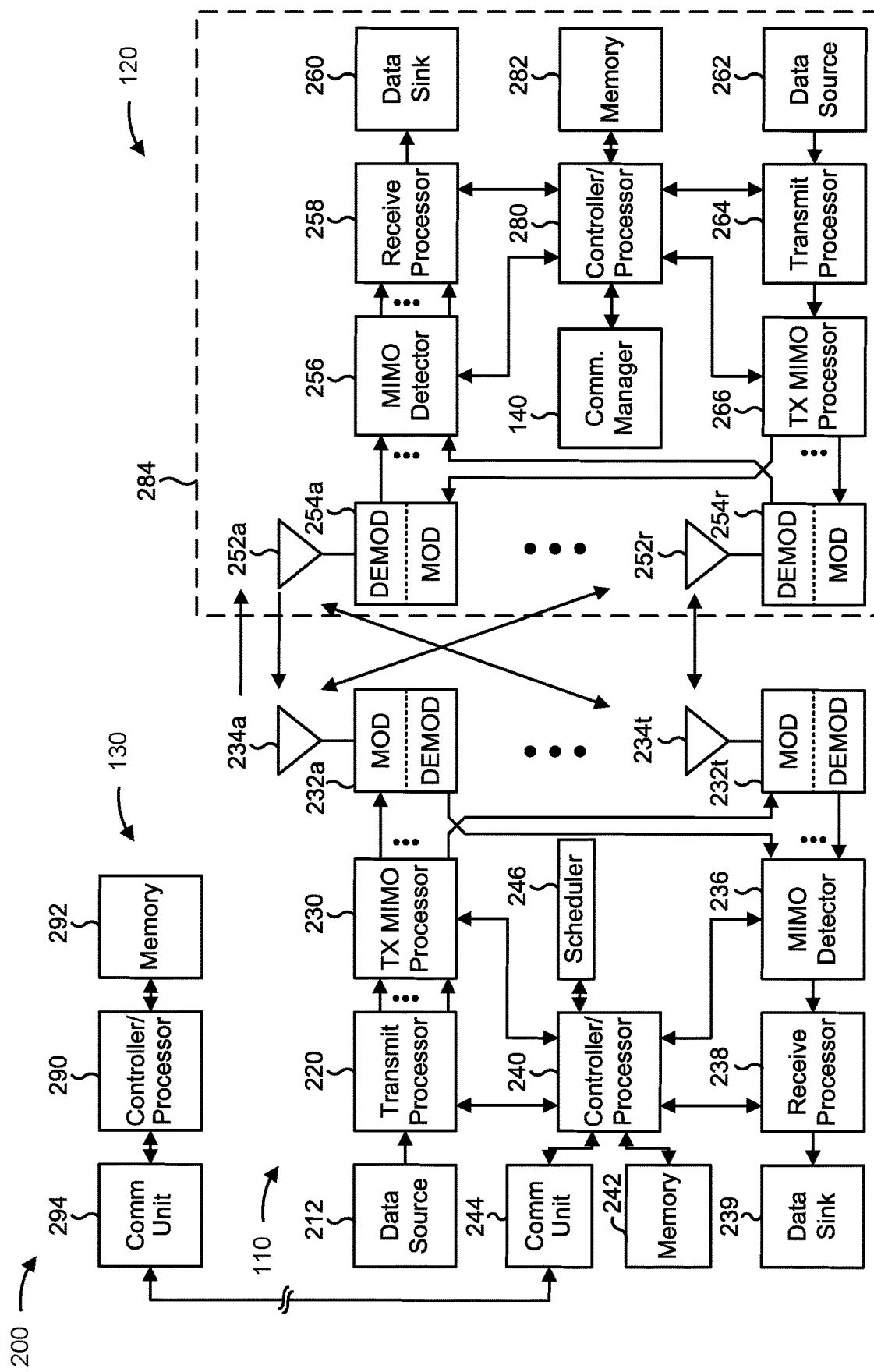
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information and control information (e.g., CQI requests, grants, and/or upper layer signaling) and provide overhead symbols and control symbols. The transmit processor 220 may generate reference symbols for reference signals or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-16).

The controller/processor 240 of the base station 110, the controller/processor 280 of the UE 120, and/or any other component(s) of FIG. 2 may perform one or more techniques associated with cross-carrier feedback with sidelink carrier aggregation, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 14 of FIG. 14, and/or other processes as described herein. In some examples, executing instructions may include running the instructions, converting the instructions, compiling the instructions, and/or interpreting the instructions, among other examples.

In some aspects, the UE includes means for receiving a configuration, wherein the configuration indicates component carriers for sidelink carrier aggregation and one or more parameters associated with cross-carrier feedback, and wherein the component carriers include a first component carrier, a second component carrier, and a third component carrier; means for receiving a first transmission block on the first component carrier and a second transmission block on the second component carrier; and/or means for transmitting a physical sidelink feedback channel (PSFCH) on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for transmitting a configuration, wherein the configuration indicates component carriers for sidelink carrier aggregation and one or more parameters associated with cross-carrier feedback, and wherein the component carriers include a first component carrier, a second component carrier, and a third component carrier; means for transmitting a first transmission block on the first component carrier and a second transmission block on the second component carrier; and/or means for receiving a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
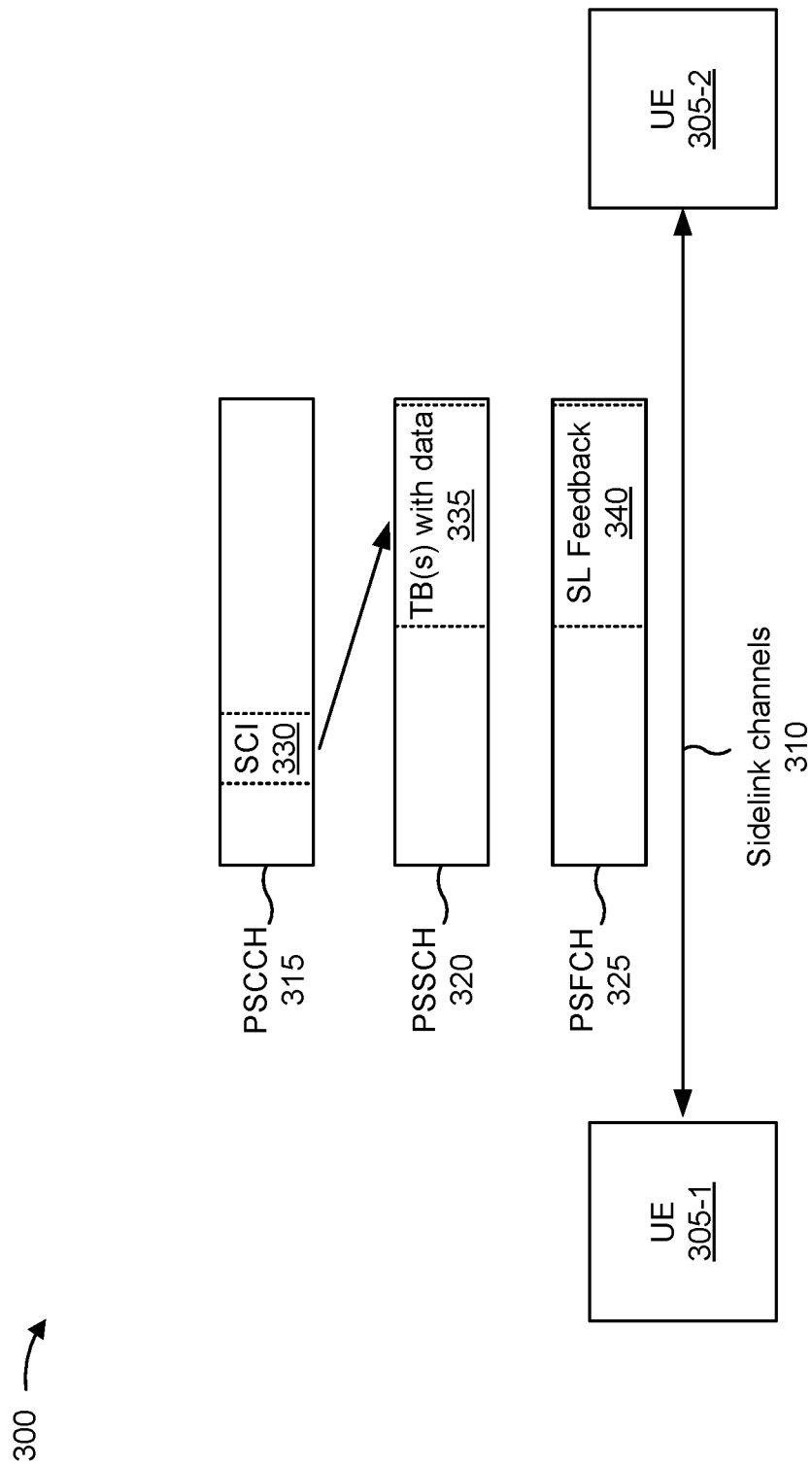
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some cases, the UEs 305 (e.g., UE 305-1 and/or UE 305-2) may correspond to one or more other UEs described elsewhere herein, such as UE 120. In some cases, the one or more sidelink channels 310 may use a PC5 interface and/or may operate in a high frequency band (e.g., the 5.9 GHz band). In some cases, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a PSFCH 325. The PSCCH 315 may be used to communicate control information, similar to a physical downlink control channel (PDCCH) used for scheduling cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information).

Although shown on the PSCCH 315, in some cases, the SCI 330 may include multiple sidelink control information in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some cases, the one or more sidelink channels 310 may use resource pools. For example, a scheduling assignment (e.g., included in SCI 330) may be transmitted in sub-channels using specific resource blocks (RBs) across time. In some cases, data transmissions (e.g., on the PSSCH 320) associated with a scheduling assignment may occupy adjacent RBs in the same subframe as the scheduling assignment (e.g., using frequency division multiplexing). In some cases, a scheduling assignment and associated data transmissions are not transmitted on adjacent RBs.

In some cases, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

In some cases, the UE 305 may perform resource selection and/or scheduling using SCI 330 received in the PSCCH 315, which may indicate occupied resources and/or channel parameters. In some cases, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some cases, a UE 305 may generate a sidelink grant that indicates one or more parameters for semi-persistent scheduling (SPS), such as a periodicity of a sidelink transmission. In some cases, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
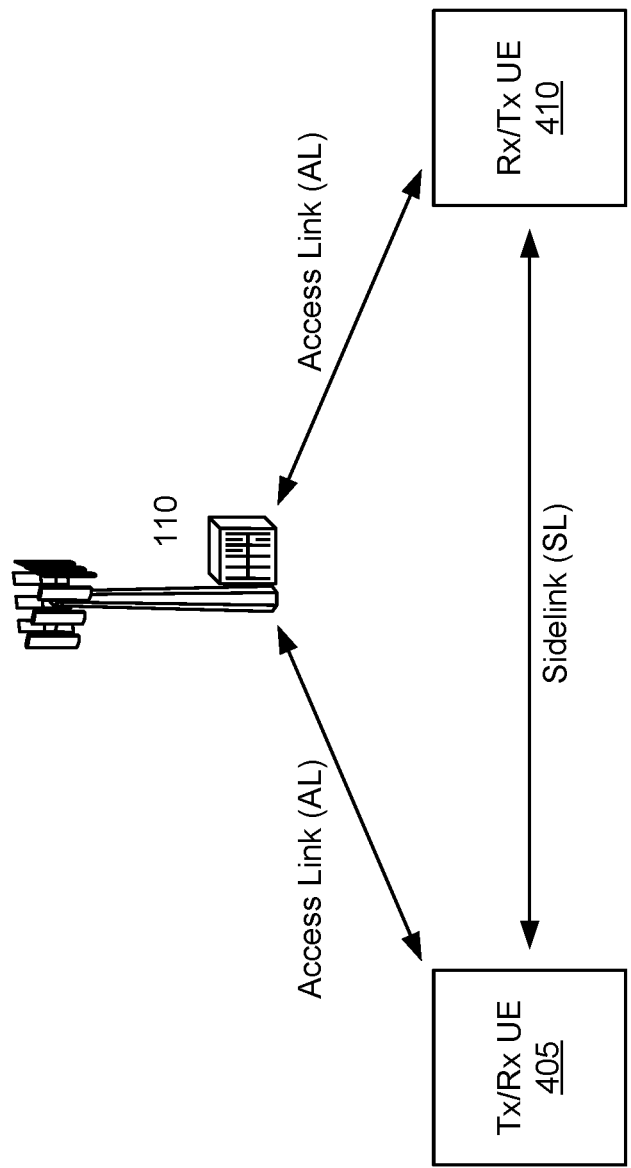
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
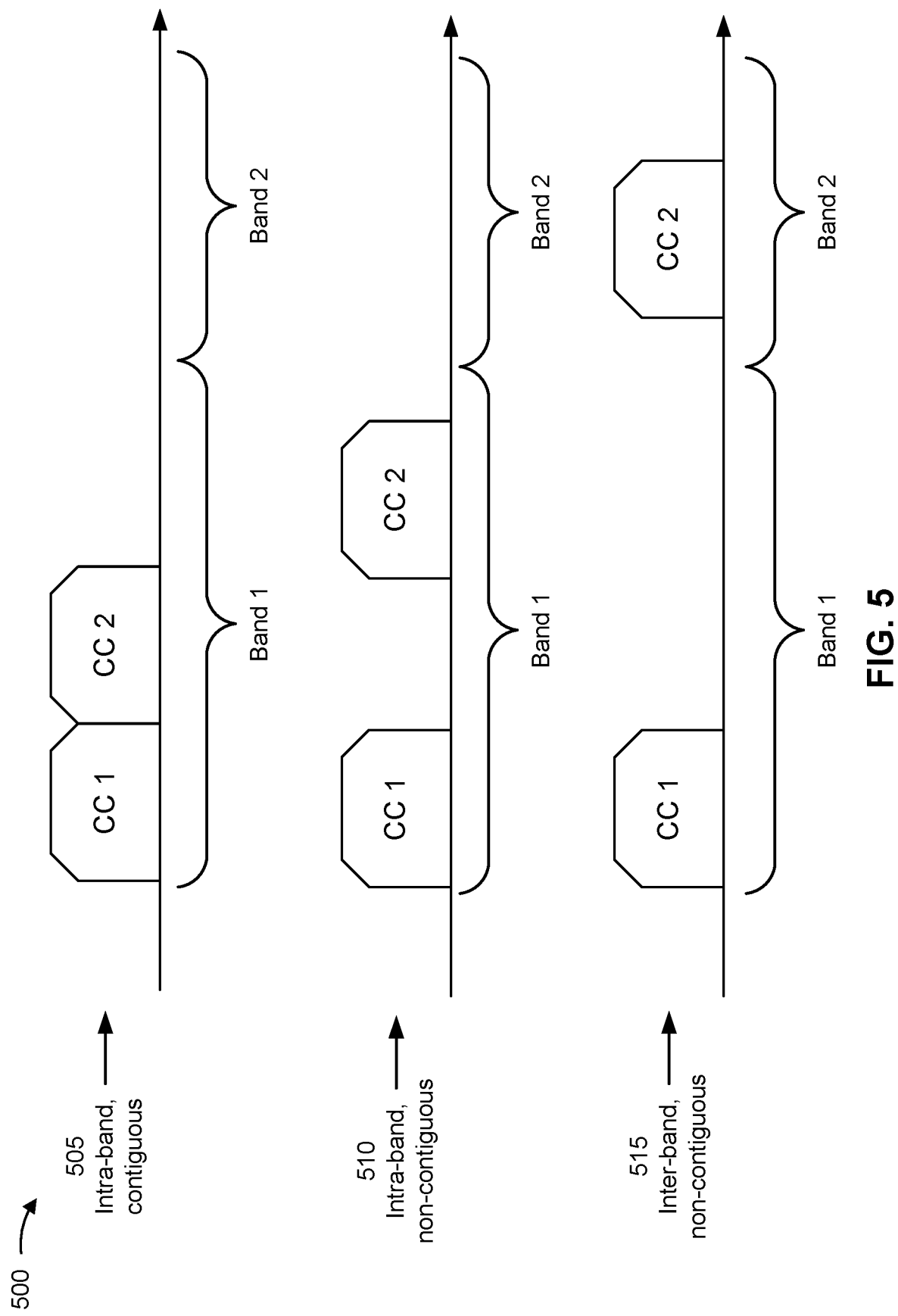
FIG. 5 is a diagram illustrating examples of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. In some cases, contiguous or non-contiguous carriers can be combined. A base station 110 may configure carrier aggregation for a UE 120, such as in a radio resource control (RRC) message, downlink control information (DCI), and/or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some cases, the primary carrier may carry control information (e.g., DCI and/or scheduling information) for scheduling data communications on one or more secondary carriers, which may be referred to as cross-carrier scheduling. In some cases, a carrier (e.g., a primary carrier or a secondary carrier) may carry control information for scheduling data communications on the carrier, which may be referred to as self-carrier scheduling or carrier self-scheduling.

A sidelink deployment may support carrier aggregation. In carrier aggregation, multiple frequency blocks (referred to as CCs or cells) are assigned to a single user. Sidelink carrier aggregation may improve sidelink throughput relative to a single-carrier configuration. For example, in sidelink carrier aggregation, a first UE and a second UE may use multiple CCs to communicate with each other. In some examples, sidelink carrier aggregation (CA) may be implemented using a plurality of resource pools. For example, each CC of a sidelink carrier aggregation configuration may include one or more bandwidth parts (BWPs), and each BWP may include one or more resource pools. In this way, each CC of a sidelink carrier aggregation configuration may be associated with a respective resource pool or resource pools. The techniques and apparatuses described herein are not limited to those involving respective resource pools for each CC and can be applied in situations where multiple CCs are configured on a single resource pool, multiple BWPs are configured on a single resource pool, multiple resource pools are configured on a single CC, and/or multiple resource pools are configured on a single BWP, among other examples.

As indicated above, FIG. 5 is provided as an example. Other examples may differ from what is described with regard to FIG. 5.

Feedback (e.g., HARQ feedback or CBR feedback, among other examples) provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit feedback indicating an ACK. If the receiver fails to receive the communication, the receiver may transmit feedback indicating a negative ACK (NACK). Thus, based at least in part on the feedback, the transmitter can determine whether the communication should be retransmitted. In some cases, feedback may be implemented using a single bit, where a first value of the bit indicates an ACK, and a second value of the bit indicates a NACK. Such a bit may be referred to as an ACK/NACK bit.

For sidelink carrier aggregation, feedback may relate to communications on multiple sidelink CCs. For example, a first UE may transmit feedback to a second UE regarding multiple PSSCHs on different CCs. As another example, a first UE may transmit separate feedback to multiple different UEs regarding PSSCHs received from the multiple different UEs on different CCs. However, if an expected configuration of the feedback is not aligned between the first UE and the second UE (or the multiple different UEs), then the feedback cannot be reliably interpreted by the recipient of the feedback. Failure to properly interpret the feedback may lead to diminished throughput, unnecessary retransmission, and usage of computing and communication resources.

Some techniques and apparatuses described herein provide a feedback mechanism for sidelink UEs using a sidelink carrier aggregation configuration. For example, some techniques and apparatuses described herein provide for reporting sidelink feedback associated with PSSCH communications received using a number of component carriers. The feedback may be reported on a single component carrier (e.g., a PSFCH). In some aspects, the feedback may include one or more ACK/NACK bits for each received PSSCH communication and a set of bits associating the ACK/NACK bits with the related component carriers (e.g., a component carrier on which a PSSCH communication related to an ACK/NACK bit is received). In this way, ambiguity regarding a component carrier associated with reported feedback is eliminated, which enables the reliable usage of feedback for sidelink carrier aggregation configurations.

FIGS. 6-12 are diagrams illustrating an example 600 associated with cross-carrier feedback with sidelink carrier aggregation, in accordance with the present disclosure. As shown in FIGS. 6-12, example 600 includes communication between a base station 110a, a special UE 110b (e.g., a roadside unit (RSU, a group lead, a cluster head, or a scheduling UE), a transmitting UE 120-1 (e.g., Tx UE 120-1, as shown), and a receiving UE 120-2 (e.g., Rx UE 120-2, as shown). In some aspects, the transmitting UE 120-1 and the receiving UE 120-2 may communicate with the base station 110 via access link communications, as described elsewhere herein. In some aspects, the special UE 110b, the transmitting UE 120-1, and the receiving UE 120-2 may communicate via sidelink communications using sidelink carrier aggregation, as described elsewhere herein.

Figure 6:
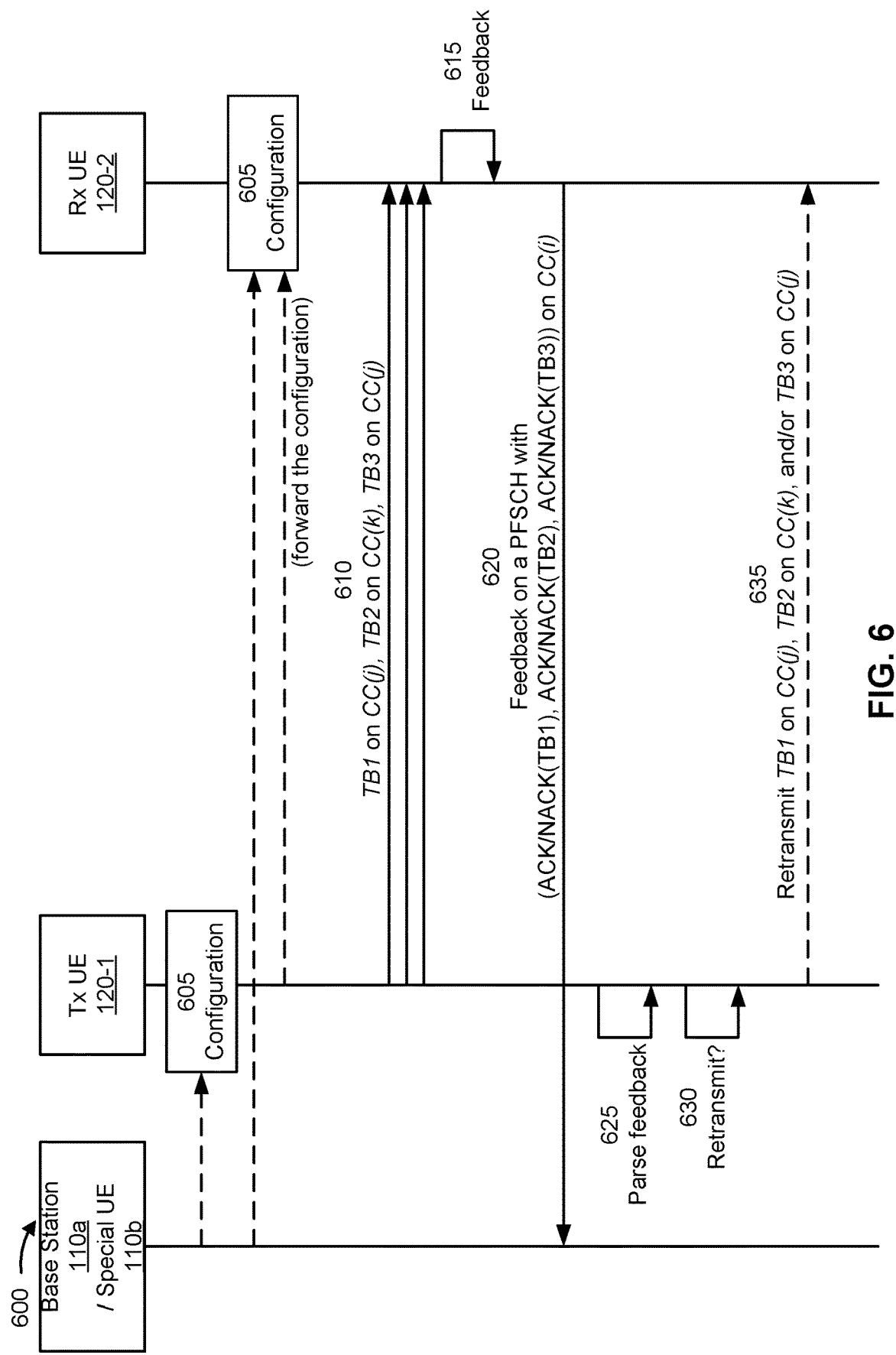
FIGS. 6-12 are diagrams illustrating examples associated with cross-carrier feedback with sidelink carrier aggregation, in accordance with the present disclosure.

As shown in FIG. 6, and by reference number 605, the receiving UE 120-2 may receive a configuration. In some aspects, the configuration may indicate component carriers for sidelink carrier aggregation. For example, the configuration may indicate a first component carrier (e.g., CC(j), as shown), a second component carrier (e.g., CC(k), as shown), and a third component carrier (e.g., CC(i), as shown) for sidelink carrier aggregation.

In some aspects, the configuration may indicate a set of activated component carriers and a set of selected component carriers. The set of selected component carriers may include one or more of the activated component carriers using cross-carrier feedback.

In some aspects, the component carriers may be associated with different spectrums. For example, a first set of the component carriers (e.g., the third component carrier) may be associated with a licensed spectrum, and a second set of the component carriers (e.g., the first component carrier and/or the second component carrier) may be associated with an unlicensed spectrum.

In some aspects, the component carriers may be associated with different operating bands. For example, the first set of component carriers may be associated with a first operating band (e.g., FR1), and the second set of component carriers may be associated with a second operating band (e.g., FR2).

In some aspects, the configuration may indicate one or more parameters associated with cross-carrier feedback. For example, the one or more parameters may include a cross-carrier feedback parameter, a total quantity of component carriers parameter, a maximum quantity of ACK/NACK bits parameter, or a quantity of symbols parameter.

In some aspects, a value of the cross-carrier feedback parameter may indicate a component carrier (e.g., the third component carrier) on which the cross-carrier feedback is to be transmitted. In some aspects, a value of the total quantity of component carriers parameter may indicate a total quantity of the component carriers using cross-carrier feedback. In some aspects, a value of the maximum quantity of ACK/NACK bits parameter may indicate a maximum quantity of ACK/NACK bits to be aggregated for each component carrier using cross-carrier feedback. In some aspects, a value of the quantity of symbols parameter may indicate a quantity of symbols associated with the PSFCH. For example, the quantity of symbols parameter may have a value of two when the PSFCH comprises a two-symbol PSFCH for aggregated ACK/NACK feedback.

In some aspects, the configuration may indicate an activated parameter value of a set of parameter values for a parameter associated with cross-carrier feedback. For example, the quantity of symbols parameter may be associated with a set of parameter values that includes a first value that indicates a first quantity of symbols (e.g., two symbols) and a second value that indicates a second quantity of symbols (e.g., three symbols). The configuration may indicate that the first value corresponds to an activated parameter value for the quantity of symbols parameter (e.g., that the PSFCH is to be transmitted using two symbols (rather than three symbols) within a sidelink slot).

In some aspects, the configuration may be received from the base station 110a via a Uu interface. For example, the base station 110a may transmit, to the transmitting UE 120-1 or the receiving UE 120-2, an indication of the configuration. In some aspects, the indication of the configuration may be indicated by MAC-CE or DCI transmitted by the base station 110a to the transmitting UE 120-1 or the receiving UE 120-2. In some aspects, the transmitting UE 120-1 or the receiving UE 120-2 may receive the configuration from the base station 110a based at least in part on being within a coverage area of the base station 110a. In some aspects, the transmitting UE 120-1 may forward the received configuration to the receiving UE 120-2 via a PC5 RRC message if the receiving UE 120-2 is out of the coverage of the base station 110a.

In some aspects, the configuration may be received from the special UE 110b via a PC5 interface. For example, the special UE 110b may transmit, to the transmitting UE 120-1 or the receiving UE 120-2, an indication of the configuration. In some aspects, the indication of the configuration may be indicated by PC5 MAC-CE or SCI transmitted by the special UE 110b to the transmitting UE 120-1 or the receiving UE 120-2. In some aspects, the transmitting UE 120-1 or the receiving UE 120-2 may receive the configuration from the special UE 110b based at least in part on being within a coverage area of the special UE 110b. In some aspects, the transmitting UE 120-1 may forward the received configuration to the receiving UE 120-2 via a PC5 RRC message (e.g., when the receiving UE 120-2 is out of the coverage area of the special UE 110b).

In some aspects, the receiving UE 120-2 may receive the configuration from the transmitting UE 120-1. For example, the transmitting UE 120-1 may transmit an indication of the configuration to the receiving UE 120-2. In some aspects, the configuration may be included in a media access control-control element (MAC-CE) transmitted via a PC5 interface of the transmitting UE 120-1. In some aspects, the indication of the configuration may be included in SCI transmitted to the receiving UE 120-2 by the transmitting UE 120-1.

In some aspects, the transmitting UE 120-1 may transmit the indication of the configuration to the receiving UE 120-2 based at least in part on receiving an indication of the configuration from the base station 110. In some aspects, the transmitting UE 120-1 may transmit the indication of the configuration to the receiving UE 120-2 based at least in part on establishing sidelink communications with the receiving UE 120-2.

In some aspects, the configuration may be preconfigured. For example, the configuration may be stored in a memory of the transmitting UE 120-1 or the receiving UE 120-2. In some aspects, the transmitting UE 120-1 or the receiving UE 120-2 may obtain the configuration from the memory based at least in part on the transmitting UE 120-1 or the receiving UE 120-2 being outside of a coverage area of the base station 110.

As shown by reference number 610, the transmitting UE 120-1 may transmit, and the receiving UE 120-2 may receive, a first TB on a first component carrier and a second TB on a second component carrier. For example, the transmitting UE 120-1 may transmit a PSSCH on a first component carrier (e.g., CC(j), as shown) with a first TB (e.g., TB1, as shown), a PSSCH on a second component (e.g., carrier (k), as shown) with a second TB (e.g., TB2, as shown), and a PSSCH on the first component (e.g., carrier (j), as shown) with a third TB (e.g., TB3, as shown).

As shown by reference number 615, the receiving UE 120-2 may determine first feedback associated with receiving the first TB on the first component carrier, second feedback associated with receiving the second TB on the second component carrier, and third feedback associated with receiving the third TB on the first component carrier. In some aspects, a first HARQ entity of the receiving UE 120-2 associated with the first component carrier may send a first set of ACK/NACK bits based at least in part on decoding the first TB received from the first component carrier to a mapping function of the receiving UE 120-2 to map to a third component carrier for cross carrier feedback transmission. The first set of ACK/NACK bits may indicate a positive ACK when the first TB is successfully received and decoded by the receiving UE 120-2. Otherwise, the first set of ACK/NACK bits may indicate a NACK to indicate to the transmitting UE 120-1 that the first TB was not successfully received and/or decoded by the transmitting UE 120-1. A second HARQ entity of the receiving UE 120-2 associated with the second component carrier and the second HARQ entity may send a second set of ACK/NACK bits based at least in part on decoding the second TB received from the second component carrier to the mapping function of the receiving UE 120-2 to map to the third component carrier for cross carrier feedback transmission. Similarly, the first HARQ entity of the receiving UE 120-2 associated with the first component carrier may send a third set of ACK/NACK bits based at least in part on decoding the third TB received from the first component carrier to the mapping function of the receiving UE 120-2 to map to the third component carrier for cross carrier feedback transmission.

In some aspects, the receiving UE 120-2 (e.g., the mapping function) may generate cross-carrier feedback carried on a PSFCH for cross carrier feedback based at least in part on the first set of ACK/NACK bits, the second set of ACK/NACK bits, and the third set of ACK/NACK bits. In some aspects, a format of PSFCH for cross-carrier feedback may be baselined from a NR PUCCH format 2 design. For example, composing the PSFCH for cross-carrier feedback may include a cyclic redundancy check (CRC) attachment to feedback sidelink control information (FSCI) bits, polar coding, rate matching, a block of bits (e.g., b(0), . . . , $b(M_{bit}-1)$) scrambled with pseudo-random sequences (e.g., $b^\sim(i)(b(i)+c(i))$ mod 2, where $c(i)$ is a pseudo-random sequence), quadrature phase shift keying (QPSK) modulation for FSCI symbols, and/or frequency-division multiple access (FDMA)-based multiplexing of DMRS and FSCI symbols (e.g., the set of QPSK modulated FSCI symbols used to transmit the cross-carrier feedback). In some aspects, the modulated FSCI symbols may be scaled for transmit power and then directly mapped on the allocated resource of the third component carrier (e.g., CC(i)).

In some aspects, the FSCI bits for cross-carrier feedback may include a set of aggregated ACK/NACK bits and an indication of an association between each ACK/NACK bit, of the set of aggregated ACK/NACK bits, and a corresponding one of the first component carrier, the second component carrier, or one of the first TB, the second TB, or the third TB.

In some aspects, the set of aggregated ACK/NACK bits may include the first set of ACK/NACK bits, the second set of ACK/NACK bits, and the third set of ACK/NACK bits, associated to the first TB, the second TB, or the third TB respectively, received from the mapping functions of the receiving UE 120-2. In some aspects, the first set of ACK/NACK bits, the second set of ACK/NACK bits, and/or the third set of ACK/NACK bits each include a single, respective ACK/NACK bit that indicates a positive acknowledgment or a negative acknowledgment associated with receiving the first TB on the first component carrier, the second TB on the second component carrier, and/or the third TB on the first component carrier, respectively.

The indication of the association between each ACK/NACK bit, of the set of aggregated ACK/NACK bits, and the corresponding one of the first component carrier, the second component carrier, the first TB, the second TB, or the third TB may include a first indication, a second indication, and a third indication. The first indication may indicate an association between the first ACK/NACK bit and the first component carrier or an association between the first ACK/NACK bit and the first TB. The second indication may indicate an association between the second ACK/NACK bit and the second component carrier or an association between the second ACK/NACK bit and the second TB. The third indication may indicate an association between the third ACK/NACK bit and the first component carrier or an association between the third ACK/NACK bit and the third TB.

In some aspects, the FSCI bits for cross-carrier feedback may include a group of fields. The group of fields may be associated with the TBs received (e.g., the first TB, the second TB, and the third TB) by the receiving UE 120-2. For example, the FSCI bits for cross-carrier feedback may include a first field associated with the first TB, a second field associated with the second TB, and a third field associated with the third TB, as described in greater detail elsewhere herein, such as, for example, with respect to FIG. 7.

In some aspects, the FSCI bits for cross-carrier feedback may include a group of fields. The group of fields may be associated with the component carriers (e.g., the first component carrier, the second component carrier, etc.) associated with the TBs received by the receiving UE 120-2. For example, the FSCI bits for cross-carrier feedback may include a first field associated with the first component carrier, and a second field associated with the second component carrier, as described in greater detail elsewhere herein, such as, for example, with respect to FIGS. 8 and 9.

Figure 7:
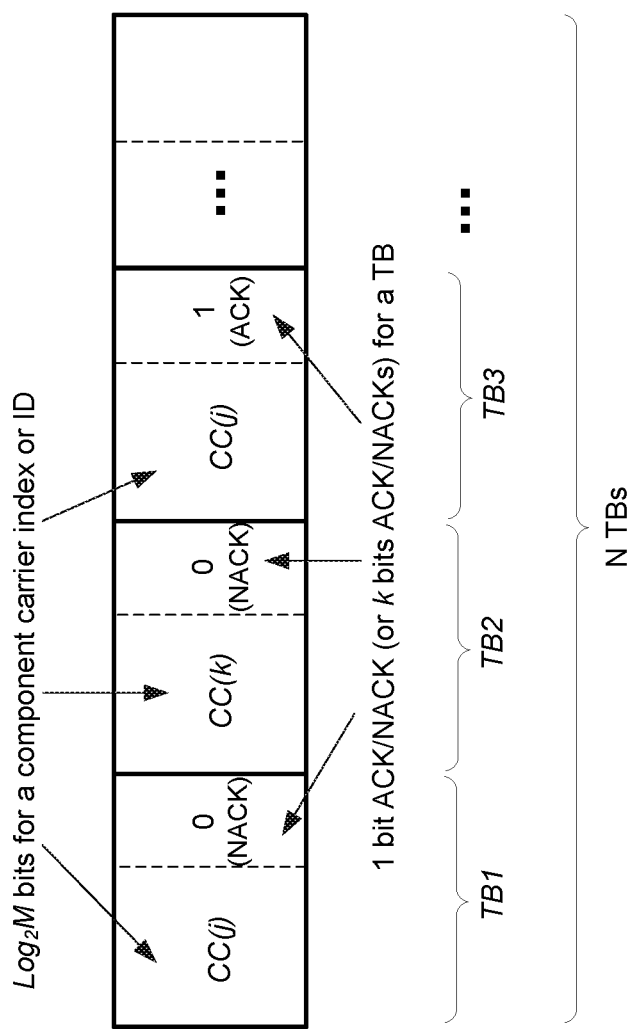

As shown in FIG. 7, in some aspects, each field of the FSCI bits (e.g., the first field is associated with the first TB) may include a first sub-field and a second sub-field. The first sub-field may include a set of bits indicating a component carrier associated with the ACK/NACK bit(s) included in the second sub-field. In some aspects, the first sub-field may include a set of bits indicating a component carrier index or an identifier associated with the component carrier. A size of the first sub-field may be equal to $\log_2 M$, where M is the total number of component carriers used for sidelink carrier aggregation for a group using groupcast, or a UE pair using unicast.

The second sub-field may include a set of ACK/NACK bits associated with a TB received on the component carrier indicated by the set of bits included in the first sub-field. For example, the second sub-field of a field associated with the first TB may include the first set of ACK/NACK bits. A size of the second sub-field may be based at least in part on a quantity of ACK/NACK bits used to indicate an acknowledgment or a negative acknowledgment. For example, a size of the second sub-field may be one bit when a single bit is used to indicate an acknowledgment or a negative acknowledgment (e.g., HARQ feedback) to the first TB received and may be K bits when a plurality of ACK/NACK bits are used to indicate one or multiple acknowledgments or one or multiple negative acknowledgments (e.g., code block group (CBG)-based ACK/NACK feedback) associated to the first TB received.

In some aspects, the association between a set of ACK/NACK bits and a received TB may be indicated implicitly via the order of the fields included in the FSCI bits for cross-carrier feedback, wherein the order of the fields may be based at least in part on an order in which the TBs were received by the receiving UE 120-2. For example, the first field associated with the first TB may be prior to the second field associated with the second TB when the first TB is received by the receiving UE 120-2 prior to the second TB. The second field associated with the second TB may be prior to the third field associated with the third TB when the second TB is received by the receiving UE 120-2 prior to the third TB.

In some aspects, when two or more TBs are received via the resources overlapped in time, an order of the field associated with the two or more TBs may be based at least in part on an order associated with the component carriers on which the two or more TBs were received. For example, when the first TB and the second TB are received at the same time, the first field associated with the first component carrier may be prior to the second field associated with the second component carrier when a component carrier index associated with the first component carrier is less than a component carrier associated with the second component carrier.

In some aspects, the total size of the FSCI bits for cross-carrier feedback may be a variable size. For example, the size of the FSCI bits for cross-carrier feedback may be based at least in part on a quantity of component carriers using cross-carrier feedback and/or a quantity of ACK/NACK bits associated with each TB. In some aspects, the size of the FSCI bits for cross-carrier feedback may be based at least in part on a total quantity of TBs received multiplied by a sum of a log base 2 of M on bits (e.g., the size of the first subfield for component carrier index or ID) plus one bit (e.g., 1 bit ACK/NACK for a TB), wherein M corresponds to a quantity of the component carriers using cross-carrier feedback. In some aspects, the size of the FSCI bits for cross-carrier feedback may be based at least in part on the equation:

$$N_{FSCI}=(\log_2 M \text{ bits}+K \text{ bits})\times N,$$

$N_{FSCI}$ is the size of the FSCI bits for cross-carrier feedback, M is the total quantity of component carriers using cross carrier feedback, K is quantity of ACK/NACK bits used for a single TB (e.g., K=1 for a single ACK/NACK bit for a received TB's HARQ feedback or K>1 for quantity of bits associated with a received TB's CBG-based HARQ feedbacks), and N is the total quantity of TBs received.

In some aspects, one or multiple values of M and/or one or more values for K may be preconfigured or configured in part based on the configuration received for a service type or layer 2 (L2) destination identifier (ID) (e.g., the L2 ID for a groupcast), or may be negotiated between a pair of UEs during or after PC5 RRC connection establishment. The one or multiple values of M and/or one or more values for K may be further activated or deactivated by base station via MAC-CE or by a special UE via a PC5 MAC-CE based at least in part on component carrier and/or multi-bit ACK/NACK (e.g., for CBG based ACK/NACK) (re)selection or activation or deactivation, respectively. The one or multiple values of M and/or one or more values for K may be further indicated by the base station 110*a* via DCI or by a special UE 110b via SCI based on component carrier(s) and/or multi-bit ACK/NACK (e.g., for CBG based ACK/NACK) dynamically selected or activated.

Figure 8:
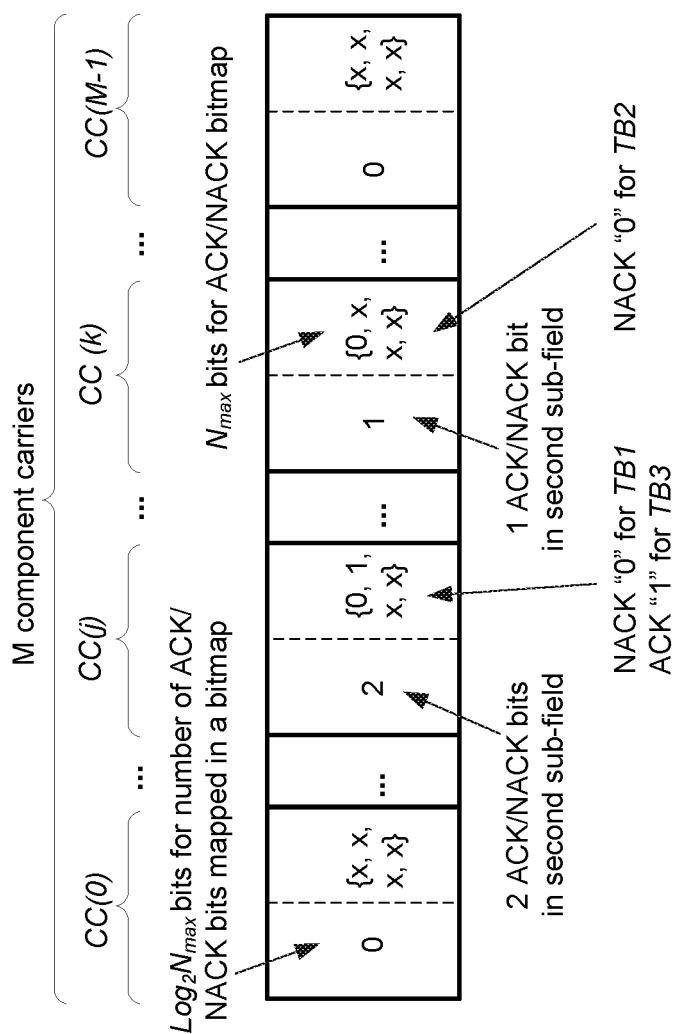

As shown in FIG. 8, in some aspects, the FSCI bits for cross-carrier feedback may include a fixed-size bitmap. The fixed-size bitmap may contain a quantity of fields for mapping a quantity of component carriers. In some aspects, the association between a set of ACK/NACK bits and a component carrier may be indicated implicitly via the order of the quantity of fields, wherein the order of the quantity of fields may be based at least in part on an order associated with the quantity of component carriers. For example, a first field associated with a first component carrier may be prior to a second field associated with a second component carrier when a component carrier index associated with the first component carrier is less than a component carrier associated with the second component carrier.

In some aspects, a field for a component carrier may include a first sub-field for a number of ACK/NACK bits and a second sub-field for an ACK/NACK bitmap. The first sub-field may indicate a total quantity of acknowledgments (e.g., sets of ACK/NACK bits) for the component carrier. For example, as shown in FIG. 8, a first sub-field of a field for a component carrier (e.g., CC(j)) indicates the number of ACK/NACK bits mapped in the second sub-field containing an ACK/NACK bitmap (e.g., 2 ACK/NACK bits mapped in the ACK/NACK bitmap).

The second sub-field may include a quantity of bits ($N_{max}$) (e.g., fixed size of $N_{max}$) for mapping sets of ACK/NACK bits. As shown in FIG. 8, the second-sub field of a field includes 4 bits (e.g., {x, x, x, x}, as shown) for a 4-bit ACK/NACK bitmap. The association between ACK/NACK bits and received TBs on a component carrier may be implicitly indicated by the order in the ACK/NACK bitmap, wherein the order in the ACK/NACK bitmap is the order of received TBs on a component carrier (e.g., the first NACK "0" bit of ACK/NACK bitmap {0, 1, x, x} is associated with the first TB received on component carrier CC(j) which is TB1 and the second ACK "1" bit of ACK/NACK bitmap {0, 1, x, x} is associated with the second TB received on component carrier CC(j) which is TB3). The first, second, third, and fourth bits may be associated with a first, second, third, and fourth TB, respectively, received on the component carrier.

In some aspects, when a quantity of TBs received on a component carrier is less than the quantity of bits ($N_{max}$) of ACK/NACK bitmap, the remaining bits unmapped are set to a predetermined value (e.g., a 0 or a 1). Because the first sub-field indicates the total quantity of acknowledgments mapped in the ACK/NACK bitmap for the component carrier, the remaining bits may not be read by the transmitting UE 120-1. For example, with respect to the component carrier CC(0), because the first sub-field indicates that the second sub-field does not include any acknowledgments, none of the bits of the second sub-field may be read by the transmitting UE 120-1.

As another example, with respect to the component carrier CC(j), because the first sub-field indicates that the second sub-field includes two acknowledgments, only the first two bits of the second sub-field may be read by the transmitting UE 120-1. As another example, with respect to the component carrier CC(k), because the first sub-field indicates that the second sub-field includes one acknowledgment, only the first bit of the second sub-field may be read by the transmitting UE 120-1.

A size of the FSCI bits for cross-carrier feedback including the fixed-size bit maps in the second sub-field may be based at least in part on a total quantity of component carriers (e.g., M). In some aspects, the size of the FSCI bits for cross-carrier feedback including the fixed-size bit maps may be determined based on the equation $$N_{FSCI} = (\log_2 N_{max} + N_{max}) \times M,$$

$N_{FSCI}$ is the size of the FSCI bits for cross-carrier feedback, M is the total quantity of component carriers, and $N_{max}$ is the maximum quantity of ACK/NACK bits of an ACK/NACK bitmap (e.g., ACK/NACK bitmap size) for each of the component carriers.

In some aspects, one or multiple values of M and/or one or more values for $N_{max}$ may be preconfigured or configured in part based on the configuration received for a service type or layer 2 (L2) destination identifier (ID) (e.g., the L2 ID for a groupcast), or may be negotiated between a pair of UEs during or after PC5 RRC connection establishment. The one or multiple values of M and/or one or more values for $N_{max}$ may be further activated or deactivated by base station via MAC-CE or by a special UE 110b via PC5 MAC CE based on component carrier and/or ACK/NACK bitmap (re)selection or activation or deactivation respectively. The one or multiple values of M and/or one or more values for $N_{max}$ may be further indicated by base station via DCI or by a special UE via SCI based on component carrier(s) and/or ACK/NACK bitmap dynamically selected or activated respectively.

Figure 9:
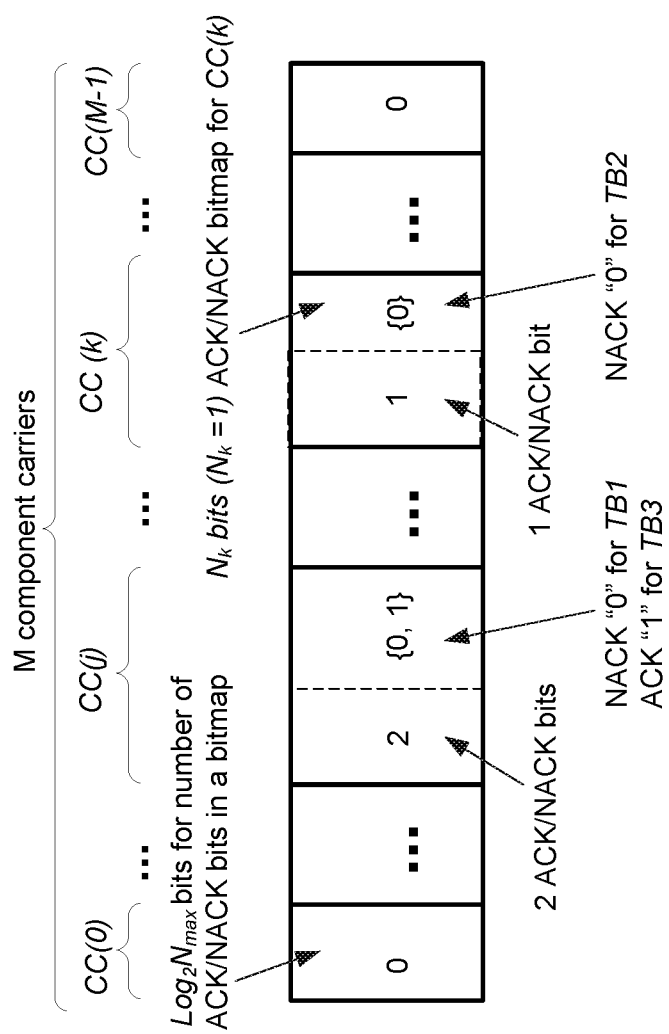

As shown in FIG. 9, in some aspects, the FSCI bits for cross-carrier feedback may include a variable-size ACK/NACK bit map. In some aspects, the variable-size FSCI bits for cross-carrier feedback may contain a quantity of fields for mapping a quantity of component carriers (e.g., M component carriers), as described above with respect to FIG. 8. In some aspects, the variable-size FSCI bits for cross-carrier feedback may contain a quantity of fields corresponding to a quantity of component carriers on which TBs were received. For example, the variable-size FSCI bits for cross-carrier feedback may contain two fields when TBs are received on two component carriers and may contain three fields when TBs are received on three component carriers.

In some aspects, the association between a set of ACK/NACK bits and a carrier component may ne implicitly indicated via the order of the quantity of fields, wherein the order of the quantity of fields may be based at least in part on an order associated with the quantity of component carriers. For example, a first field associated with a first component carrier may be prior to a second field associated with a second component carrier when a component carrier index associated with the first component carrier is less than a component carrier associated with the second component carrier.

In some aspects, a field for a component carrier may include a first sub-field for a number of ACK/NACK bits and a second sub-field for an ACK/NACK bitmap.

The first sub-field may indicate a total quantity of acknowledgments (e.g., sets of ACK/NACK bits) for the component carrier. For example, as shown in FIG. 9, a first sub-field of a field for a component carrier (e.g., CC(j)) indicates the number of ACK/NACK bits in the second sub-field contains containing an ACK/NACK bitmap (e.g., 2 ACK/NACK bits in the ACK/NACK bitmap).

In some aspects, a size of the first sub-field may be based at least in part on a total quantity of acknowledgments for a component carrier. For example, the size of the first sub-field for each component carrier may determined by $\log_2 N_{max}$, where $N_{max}$ is the maximum ACK/NACKs of component carriers.

The second sub-field may include a quantity of variable bits (e.g., Nm ACK/NACK bits for component carrier m, m∈M−1) for ACK/NACK bitmapping the quantity of acknowledgments indicated in the first sub-field. The association between ACK/NACK bits and received TBs on a component carrier may be implicitly indicated by the order in the ACK/NACK bitmap, wherein the order in the ACK/NACK bitmap is the order of received TBs on a component carrier (e.g., the first NACK "0" bit of ACK/NACK bitmap {0, 1} is associated with the first TB received on component carrier CC(j) which is TB1 and the second ACK "1" bit of ACK/NACK bitmap {0, 1} is associated with the second TB received on component carrier CC(j) which is TB3). The first, second, third, and fourth bits may be associated with a first, second, third, and fourth TB, respectively, received on the component carrier. For example, as shown in FIG. 9, with respect to the component carrier CC(0), because the first sub-field indicates that the second sub-field does not include any acknowledgments, the second-sub field does not include any bits.

As another example, as shown in FIG. 9, with respect to the component carrier CC(j), because the first sub-field indicates that the second sub-field ACK/NACK bitmap includes two acknowledgments, the second subfield ACK/NACK bitmap includes two bits (e.g., a bitmap {0, 1} with "0" indicating a NACK for the first TB received on component carrier CC(j) and a "1" indicating an ACK for the second TB received on component carrier CC(j)).

As another example, as shown in FIG. 9, with respect to the component carrier CC(k), because the first sub-field indicates that the second sub-field includes one acknowledgment, the second subfield ACK/NACK bitmap includes one bit (e.g., a bitmap {0} with "0" indicating a NACK for the first TB received on component carrier CC(k)).

A size of the FSCI bits for cross-carrier feedback including the variable-size ACK/NACK bitmap may be based at least in part on a total quantity of component carriers (e.g., M) on which TBs were received. In some aspects, the size of the FSCI bits for cross-carrier feedback including the variable-size bit maps may be determined based on the equation $$N_{FSCI} = \sum_{m=0}^{m=M-1}(\log_2 N\max + Nm),$$

$N_{FSCI}$ is the size of the FSCI for cross-carrier feedback, M is the total quantity of component carriers using cross carrier feedback, $N_{max}$ is the maximum quantity of bits for indicating the total quantity of acknowledgments for component carriers, and Nm is the quantity of bits indicating the quantity of acknowledgments for the component carrier CC(m) where m∈M−1.

In some aspects, one or multiple values of M and/or one or more values for $N_{max}$ and/or one or more values for Nm may be preconfigured or configured in part based on the configuration received for a service type or layer 2 (L2) destination identifier (ID) (e.g., the L2 ID for a groupcast), or may be negotiated between a pair of UEs during or after PC5 RRC connection establishment. The one or multiple values of M and/or one or more values for $N_{max}$ and/or one or more values for Nm may be further activated or deactivated by the base station 110a via a MAC-CE or by the special UE 110b via a PC5 MAC-CE based at least in part on component carrier and/or ACK/NACK bitmap (re)selection or activation or deactivation, respectively. The one or multiple values of M and/or one or more values for $N_{max}$ and/or one or more values for Nm may be further indicated by the base station 110a via DCI or by the special UE 110b via SCI based at least in part on component carrier(s) and/or ACK/NACK bitmap dynamically selected or activated, respectively.

Figure 10:
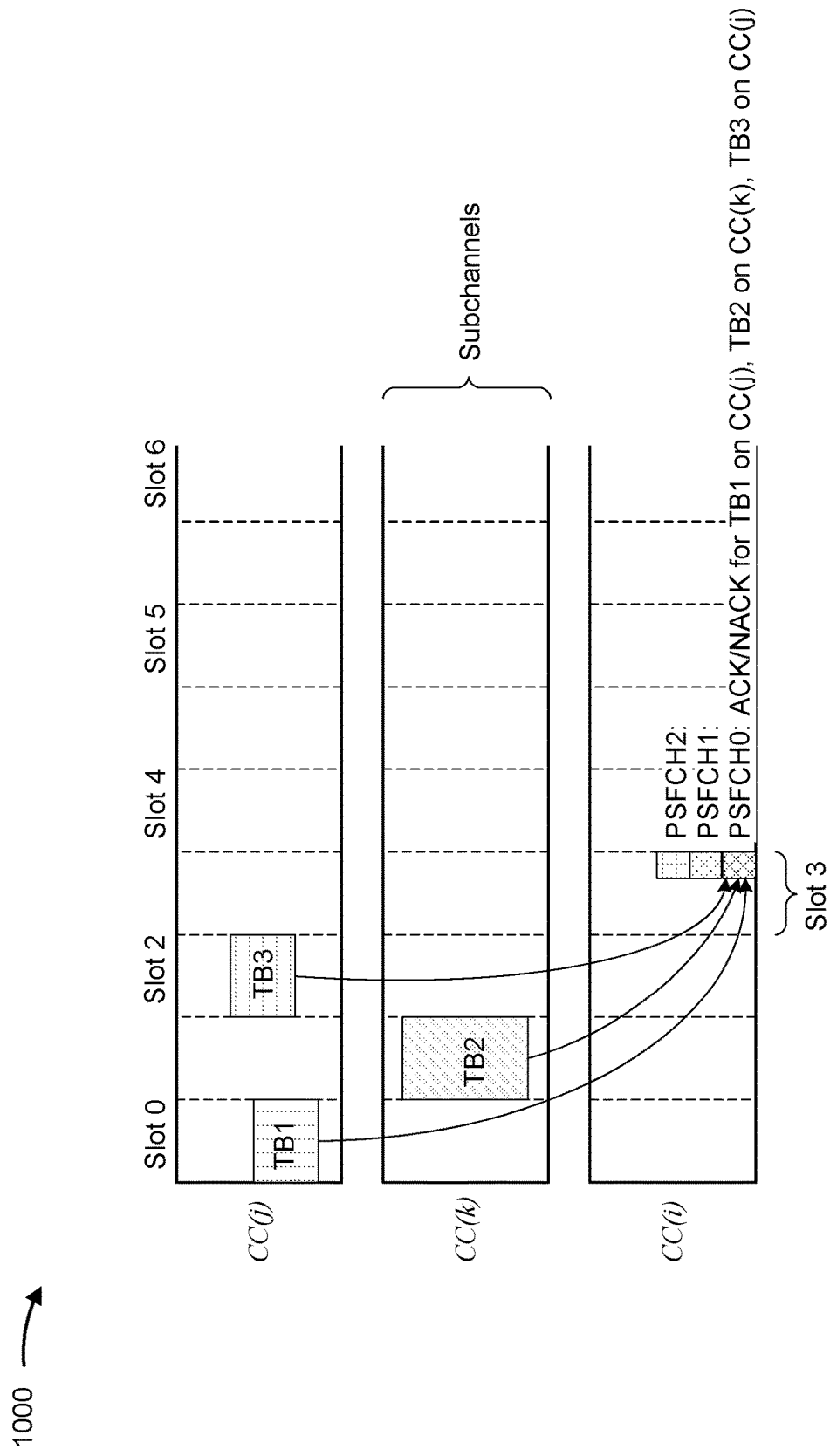

Returning to FIG. 6, as shown by reference number reference number 620, the receiving UE 120-2 may transmit, and the transmitting UE 120-1 may receive, the cross-carrier feedback on a third component carrier (e.g., CC(i)). For example, as shown in FIG. 10, the receiving UE 120-2 may transmit a PSFCH (e.g., PSFCH0, as shown) on component carrier CC(i) with the cross-carrier feedback. The PSFCH may aggregate the cross-carrier feedback for the first TB, the second TB, and the third TB. In some aspects, the PSFCH may comprise a two symbol PSFCH with a quantity of physical resource blocks (PRBs) for aggregating ACK/NACK bits for different component carriers mapped within a sidelink slot.

Figure 11:
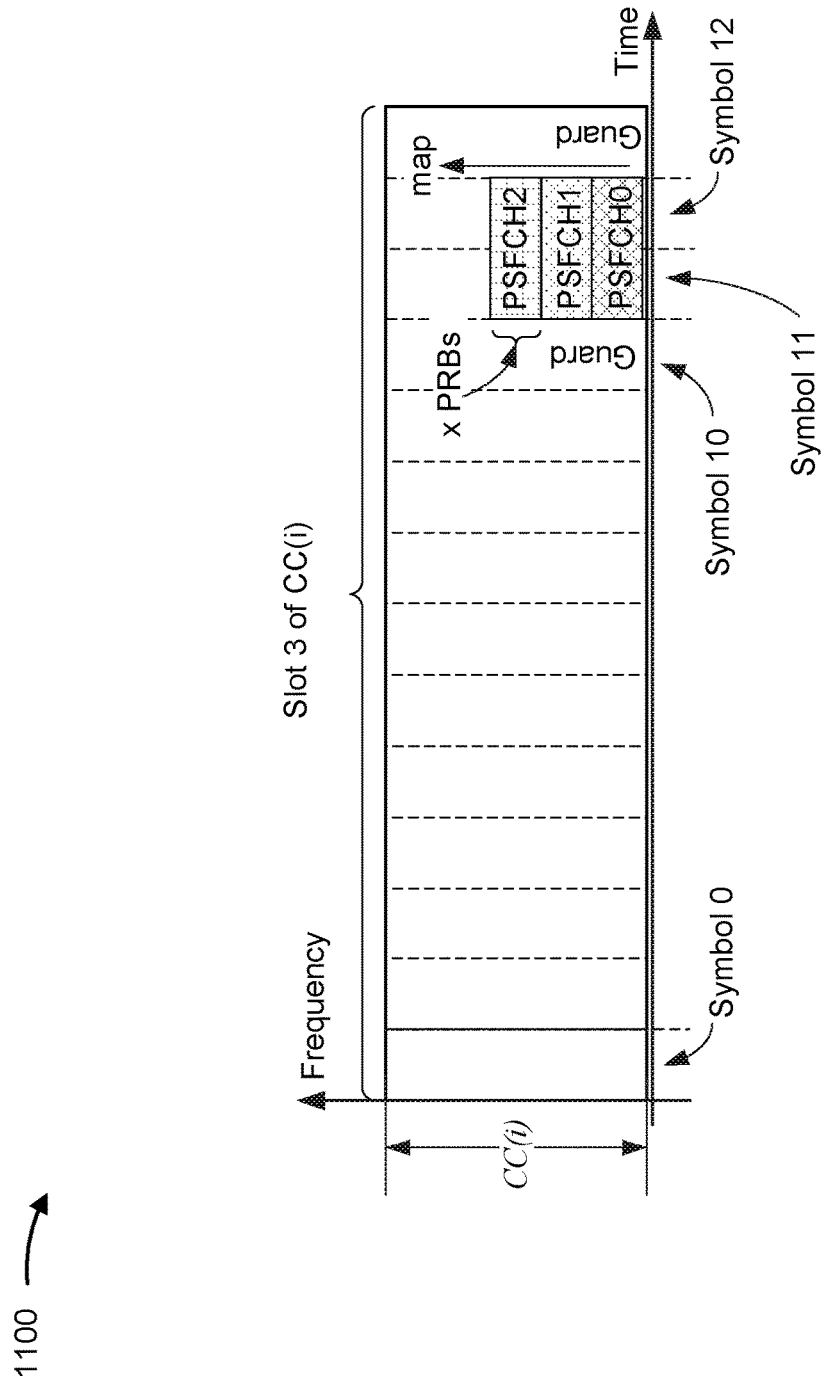

As shown in FIG. 11, in some aspects, the PSFCH with cross-carrier feedback may be transmitted using a last two symbols (e.g., symbols 11 and 12, as shown) occurring, in time, before a guard symbol (e.g., a gap) at an end of a sidelink slot. In some aspects, the PSFCH with cross-carrier feedback may be transmitted using a series of symbols. A first symbol (e.g., symbol 11, as shown), of the series of symbols, may immediately follow, in time, a guard symbol (e.g., a gap at symbol 10, as shown) included in a sidelink slot.

In some aspects, the PSFCH for cross-carrier feedback may not include an automatic gain control (AGC) symbol. The transmitting UE 120-1 may use a first portion (e.g., the first symbol) of the PSFCH for cross-carrier feedback for AGC.

Figure 12:
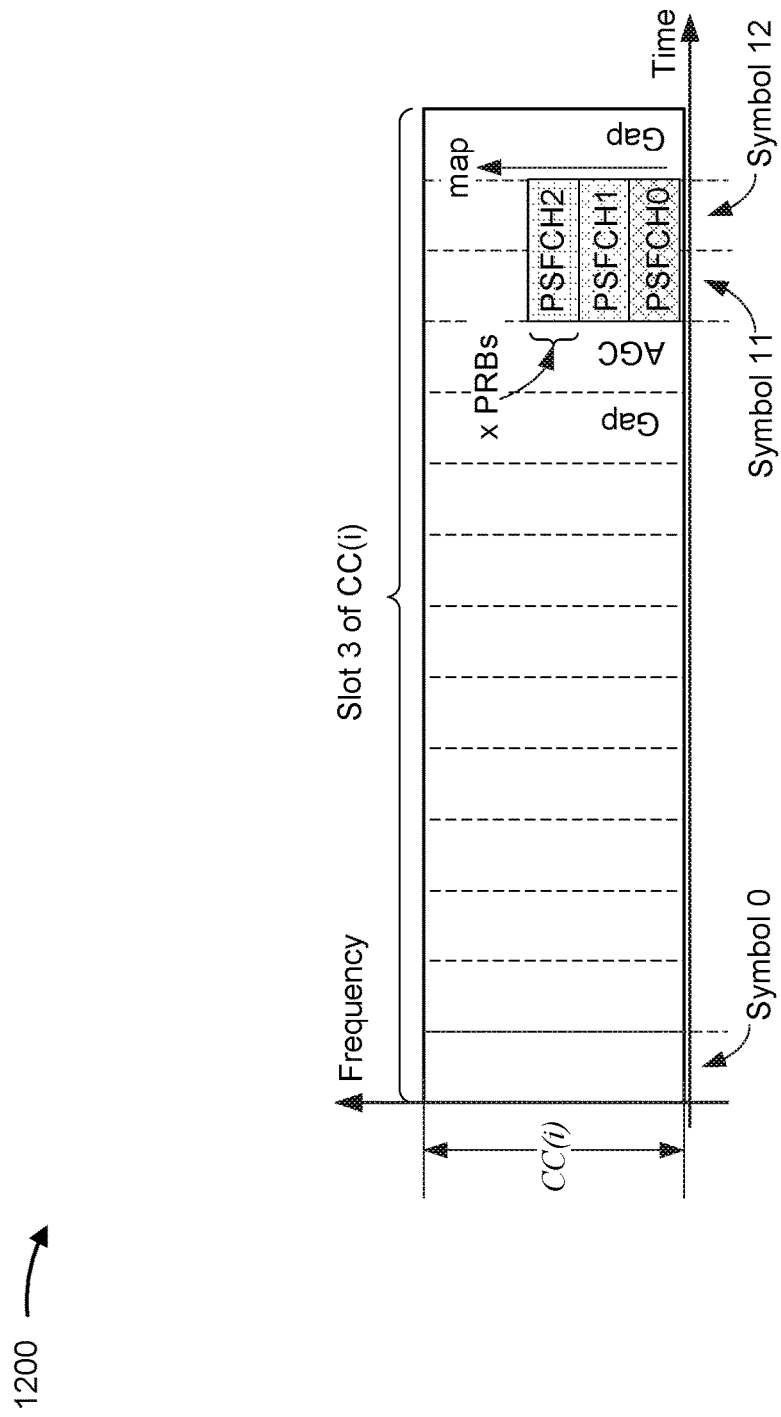

As shown in FIG. 12, in some aspects, the PSFCH with cross-carrier feedback may include an AGC symbol. In some aspects, a portion of the PSFCH with cross-carrier feedback may be duplicated for the AGC symbol.

Returning to FIG. 6, as shown by reference number 625, the transmitting UE 120-1 may parse the PSFCH with cross-carrier feedback to determine the feedback associated with transmitting the first TB on the first component carrier (e.g., the first set of ACK/NACK bits), the feedback associated with transmitting the second TB on the second component carrier (e.g., the second set of ACK/NACK bits), and the feedback associated with transmitting the third TB on the first component carrier (e.g., the third set of ACK/NACK bits).

As shown by reference number 630, the transmitting UE 120-1 may determine whether to retransmit the first TB, the second TB, and/or the third TB to the receiving UE 120-2 based at least in part on the cross-carrier feedback.

In some aspects, as shown by reference number 635, the transmitting UE 120-1 may retransmit the first TB, the second TB, and/or the third TB to the receiving UE 120-2. For example, the transmitting UE 120-1 may retransmit the first TB on the first component carrier when the first set of ACK/NACK bits indicates a negative acknowledgment. The transmitting UE 120-1 may retransmit the second TB on the second component carrier when the second set of ACK/NACK bits indicates a negative acknowledgment. The transmitting UE 120-1 may retransmit the third TB on the first component carrier when the third set of ACK/NACK bits indicates a negative acknowledgment.

As indicated above, FIGS. 6-12 are provided as examples. Other examples may differ from what is described with respect to FIGS. 6-12.

Figure 13:
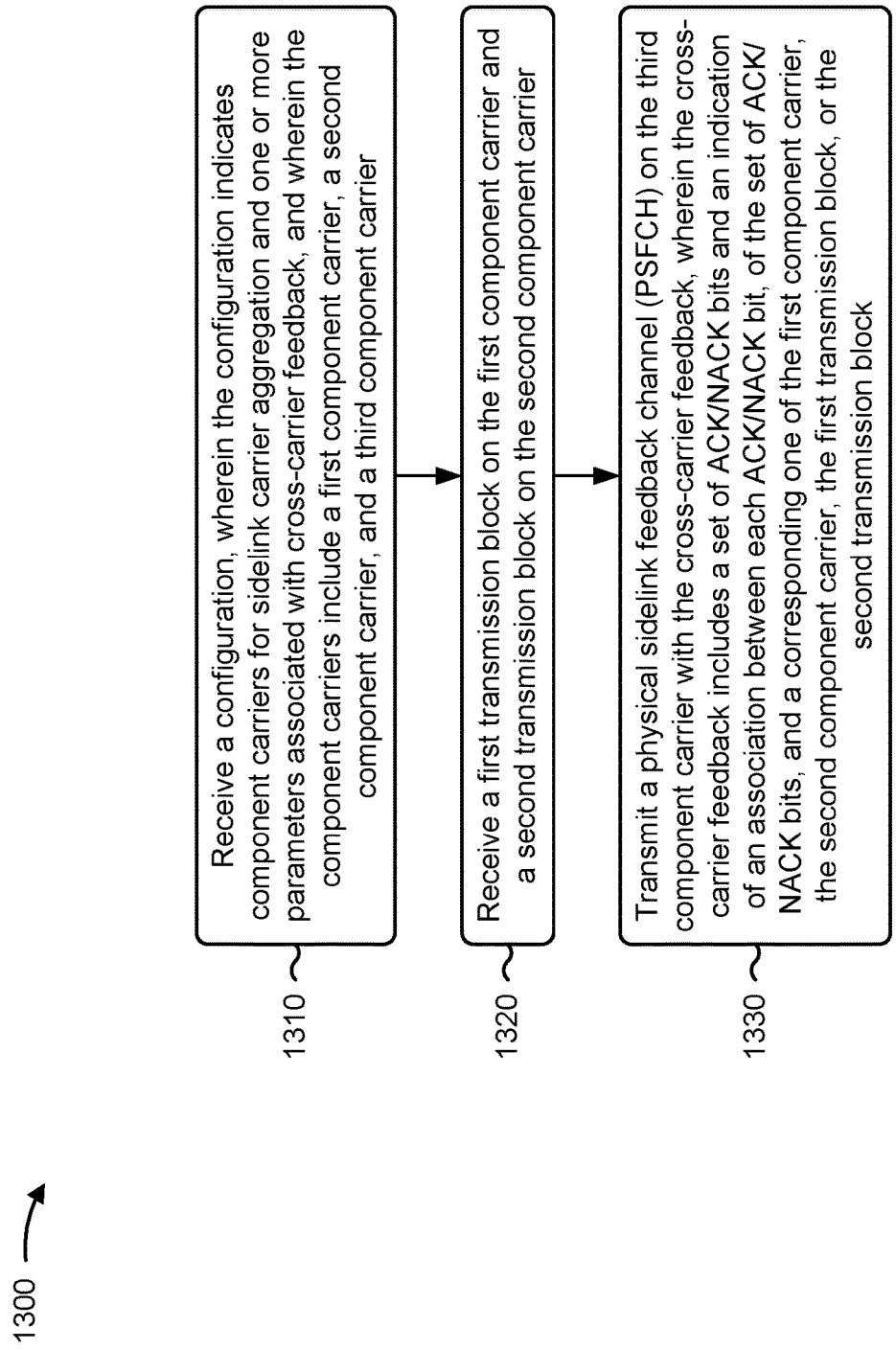
FIGS. 13 and 14 are diagrams illustrating example processes associated with cross-carrier feedback with sidelink carrier aggregation, in accordance with the present disclosure.

FIG. 13 is a diagram illustrating an example process 1300 performed, for example, by a UE, in accordance with the present disclosure. Example process 1300 is an example where the UE (e.g., UE 120, receiving UE 120-2) performs operations associated with cross-carrier feedback with sidelink carrier aggregation.

As shown in FIG. 13, in some aspects, process 1300 may include receiving a configuration, wherein the configuration indicates component carriers for sidelink carrier aggregation and one or more parameters associated with cross-carrier feedback, and wherein the component carriers include a first component carrier, a second component carrier, and a third component carrier (block 1310). For example, the UE (e.g., using communication manager 140 and/or reception component 1502, depicted in FIG. 15) may receive a configuration, wherein the configuration indicates component carriers for sidelink carrier aggregation and one or more parameters associated with cross-carrier feedback, and wherein the component carriers include a first component carrier, a second component carrier, and a third component carrier, as described above.

As further shown in FIG. 13, in some aspects, process 1300 may include receiving a first transmission block on the first component carrier and a second transmission block on the second component carrier (block 1320). For example, the UE (e.g., using communication manager 140 and/or reception component 1502, depicted in FIG. 15) may receive a first transmission block on the first component carrier and a second transmission block on the second component carrier, as described above.

As further shown in FIG. 13, in some aspects, process 1300 may include transmitting a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block (block 1330). For example, the UE (e.g., using communication manager 140 and/or transmission component 1504, depicted in FIG. 15) may transmit a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block, as described above.

Process 1300 may include additional aspects, such as any single aspect or any combination of aspects described below and/or in connection with one or more other processes described elsewhere herein.

In a first aspect, the set of ACK/NACK bits includes a first ACK/NACK bit indicating a first positive acknowledgment or a first negative acknowledgment associated with receiving the first transmission block and a second ACK/NACK bit indicating a second positive acknowledgment or a second negative acknowledgment associated with receiving the second transmission block.

In a second aspect, alone or in combination with the first aspect, the indication of the association between each ACK/NACK bit, of the set of ACK/NACK bits, and the corresponding one of the first component carrier, the second component carrier, the first transmission block, or the second transmission block includes a first indication and a second indication, wherein the first indication indicates an association between the first ACK/NACK bit and the first component carrier or an association between the first ACK/NACK bit and the first transmission block, and wherein the second indication indicates an association between the second ACK/NACK bit and the second component carrier or an association between the second ACK/NACK bit and the second transmission block.

In a third aspect, alone or in combination with one or more of the first and second aspects, the configuration indicates that the cross-carrier feedback is transmitted on the third component carrier, a total quantity of the component carriers, and a maximum quantity of ACK/NACK bits for each component carrier, of the component carriers.

In a fourth aspect, alone or in combination with one or more of the first through third aspects, receiving the configuration includes receiving a pre-configuration when the UE being outside of a coverage of a network or a configuration when the UE being within the coverage of the network.

In a fifth aspect, alone or in combination with one or more of the first through fourth aspects, one or more of the first component carrier or the second component carrier is associated with an unlicensed spectrum, and wherein the third component carrier is associated with a licensed spectrum.

In a sixth aspect, alone or in combination with one or more of the first through fifth aspects, one or more of the first component carrier or the second component carrier is associated with a first operating band, and wherein the third component carrier is associated with a second operating band that is different from the first operating band.

In a seventh aspect, alone or in combination with one or more of the first through sixth aspects, the first operating band is associated with a frequency range from 24.25 GHz through 52.6 GHz and the second operating band is associated with a frequency range from 410 MHz through 7.125 GHz.

In an eighth aspect, alone or in combination with one or more of the first through seventh aspects, the one or more parameters are associated with the PSFCH comprising two symbols.

In a ninth aspect, alone or in combination with one or more of the first through eighth aspects, the one or more parameters include one or more of a first parameter indicating that the third component carrier is to be used for transmitting the cross-carrier feedback, a second parameter indicating a quantity of symbols to be used for transmitting the cross-carrier feedback, a third parameter indicating a total quantity of the component carriers using cross carrier feedback, or a fourth parameter indicating a total quantity of ACK/NACK bits to be aggregated for each of the component carriers.

In a tenth aspect, alone or in combination with one or more of the first through ninth aspects, the configuration indicates one or more selected component carriers and one or more activated component carriers, wherein the one or more activated component carriers are included in the one or more selected component carriers.

In an eleventh aspect, alone or in combination with one or more of the first through tenth aspects, the configuration indicates one or more selected parameter values for the one or more parameters and one or more activated parameter values, wherein the one or more activated parameter values are included in the one or more selected parameter values.

In a twelfth aspect, alone or in combination with one or more of the first through eleventh aspects, the configuration is included in an MAC-CE transmitted via a PC5 interface.

In a thirteenth aspect, alone or in combination with one or more of the first through twelfth aspects, the PSFCH comprises a two symbol PSFCH with a quantity of PRBs for aggregating ACK/NACK bits for different component carriers mapped within a sidelink slot.

In a fourteenth aspect, alone or in combination with one or more of the first through thirteenth aspects, the cross-carrier feedback is transmitted using a last two symbols occurring, in time, before a guard symbol at an end of a sidelink slot.

In a fifteenth aspect, alone or in combination with one or more of the first through fourteenth aspects, the cross-carrier feedback is transmitted using a series of symbols, and wherein a first symbol, of the series of symbols, immediately follows, in time, a guard symbol included in a sidelink slot.

In a sixteenth aspect, alone or in combination with one or more of the first through fifteenth aspects, the cross-carrier feedback includes an automatic gain control symbol.

In a seventeenth aspect, alone or in combination with one or more of the first through sixteenth aspects, a portion of the cross-carrier feedback is transmitted using the automatic gain control symbol.

In an eighteenth aspect, alone or in combination with one or more of the first through seventeenth aspects, the cross-carrier feedback has a variable size, and wherein the variable size is based at least in part on a quantity of the component carriers.

In a nineteenth aspect, alone or in combination with one or more of the first through eighteenth aspects, the cross-carrier feedback includes a group of fields, and wherein each field, of the group of fields, is associated with a respective component carrier of the component carriers.

In a twentieth aspect, alone or in combination with one or more of the first through nineteenth aspects, an order of fields included in the group of fields corresponds to an order of transmission blocks received by the UE.

In a twenty-first aspect, alone or in combination with one or more of the first through twentieth aspects, wherein, when two or more transmission blocks, of the transmission blocks received by the UE, are received via a same time resource, an order of fields associated with the two or more transmission blocks is based at least in part on an order associated with the component carriers.

In a twenty-second aspect, alone or in combination with one or more of the first through twenty-first aspects, the order associated with the component carriers is based at least in part on a respective component carrier index associated with each of the component carriers.

In a twenty-third aspect, alone or in combination with one or more of the first through twenty-second aspects, a field, of the group of fields, contains a quantity of bits indicating a component carrier associated with the field and one ACK/NACK bit.

In a twenty-fourth aspect, alone or in combination with one or more of the first through twenty-third aspects, a field, of the group of fields, contains a quantity of bits indicating a component carrier associated with the field and a quantity of ACK/NACK bits, and wherein the quantity of ACK/NACK bits are associated with CBG-based feedback.

In a twenty-fifth aspect, alone or in combination with one or more of the first through twenty-fourth aspects, a size of the cross-carrier feedback is a variable size that is based at least in part on a total quantity of ACK/NACK bits included in the cross-carrier feedback multiplied by a sum of one plus a log base 2 of M, wherein M corresponds to a quantity of the component carriers.

In a twenty-sixth aspect, alone or in combination with one or more of the first through twenty-fifth aspects, a size of the cross-carrier feedback is a variable size that is based at least in part on a total quantity of ACK/NACK bits included in the cross-carrier feedback multiplied by a sum of K plus a log base 2 of M, wherein K corresponds to a quantity of bits associated with CBG-based feedback and M corresponds to a quantity of the component carriers.

In a twenty-seventh aspect, alone or in combination with one or more of the first through twenty-sixth aspects, the cross-carrier feedback includes a fixed-size bitmap that contains a quantity of fields for mapping the component carriers.

In a twenty-eighth aspect, alone or in combination with one or more of the first through twenty-seventh aspects, the cross-carrier feedback includes a variable size bitmap, wherein the variable size bitmap contains a quantity of fields corresponding to a quantity of the component carriers.

In a twenty-ninth aspect, alone or in combination with one or more of the first through twenty-eighth aspects, an order of the quantity of fields within a sidelink slot corresponds to an order of the component carriers.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
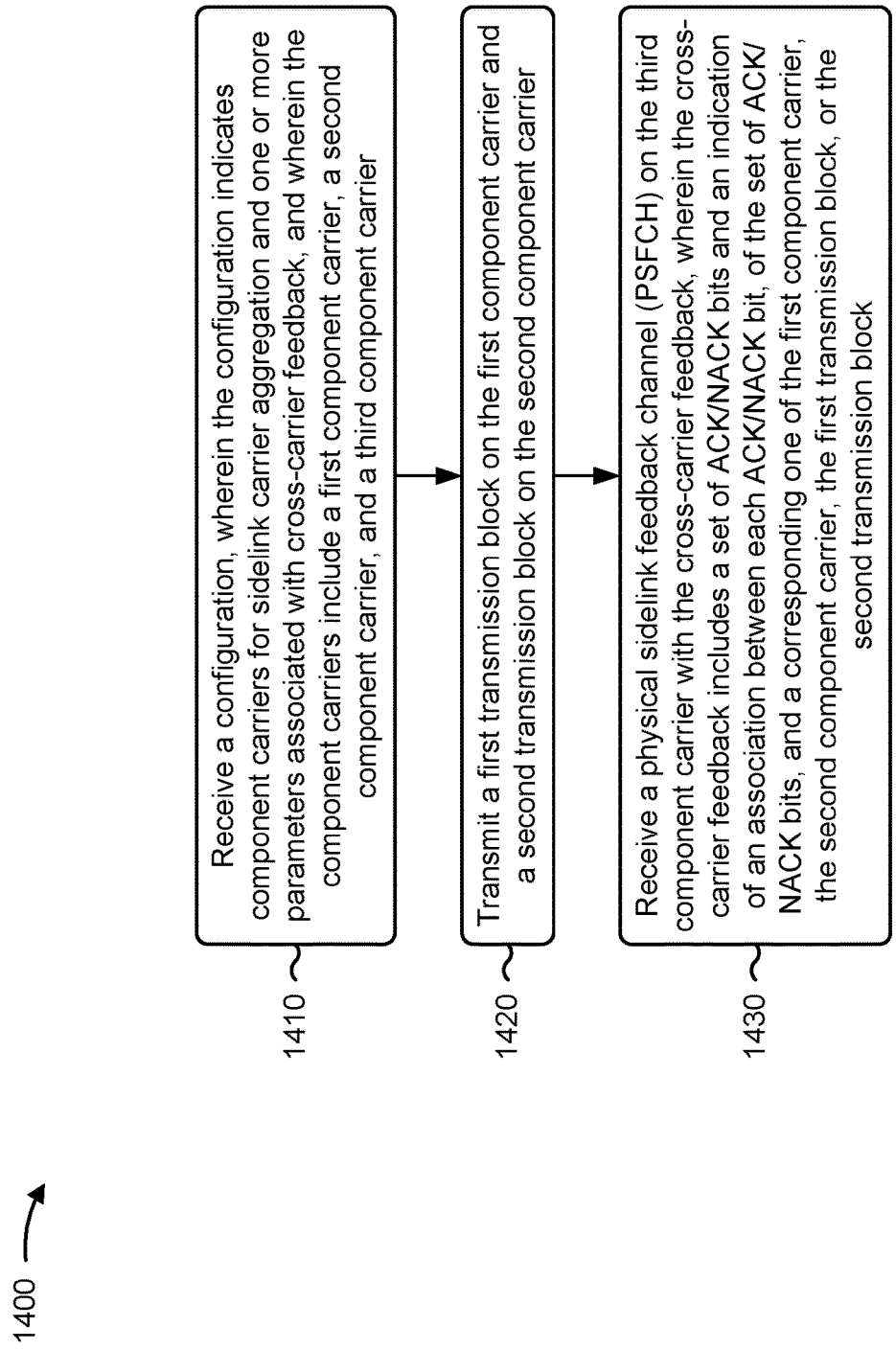

FIG. 14 is a diagram illustrating an example process 1400 performed, for example, by a UE, in accordance with the present disclosure. Example process 1400 is an example where the UE (e.g., UE 120, transmitting UE 120-1) performs operations associated with cross-carrier feedback with sidelink carrier aggregation.

As shown in FIG. 14, in some aspects, process 1400 may include receiving a configuration, wherein the configuration indicates component carriers for sidelink carrier aggregation and one or more parameters associated with cross-carrier feedback, and wherein the component carriers include a first component carrier, a second component carrier, and a third component carrier (block 1410). For example, the UE (e.g., using communication manager 140 and/or reception component 1602, depicted in FIG. 16) may receive a configuration, wherein the configuration indicates component carriers for sidelink carrier aggregation and one or more parameters associated with cross-carrier feedback, and wherein the component carriers include a first component carrier, a second component carrier, and a third component carrier, as described above.

As further shown in FIG. 14, in some aspects, process 1400 may include transmitting a first transmission block on the first component carrier and a second transmission block on the second component carrier (block 1420). For example, the UE (e.g., using communication manager 140 and/or transmission component 1604, depicted in FIG. 16) may transmit a first transmission block on the first component carrier and a second transmission block on the second component carrier, as described above.

As further shown in FIG. 14, in some aspects, process 1400 may include receiving a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block (block 1430). For example, the UE (e.g., using communication manager 140 and/or reception component 1602, depicted in FIG. 16) may receive a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block, as described above.

Process 1400 may include additional aspects, such as any single aspect or any combination of aspects described below and/or in connection with one or more other processes described elsewhere herein.

In a first aspect, the set of ACK/NACK bits includes a first ACK/NACK bit indicating a first positive acknowledgment or a first negative acknowledgment associated with receiving the first transmission block and a second ACK/NACK bit indicating a second positive acknowledgment or a second negative acknowledgment associated with receiving the second transmission block.

In a second aspect, alone or in combination with the first aspect, the indication of the association between each ACK/NACK bit, of the set of ACK/NACK bits, and the corresponding one of the first component carrier, the second component carrier, the first transmission block, or the second transmission block includes a first indication and a second indication, wherein the first indication indicates an association between the first ACK/NACK bit and the first component carrier or an association between the first ACK/NACK bit and the first transmission block, and wherein the second indication indicates an association between the second ACK/NACK bit and the second component carrier or an association between the second ACK/NACK bit and the second transmission block.

In a third aspect, alone or in combination with one or more of the first and second aspects, the configuration indicates that the cross-carrier feedback is transmitted on the third component carrier, a total quantity of the component carriers, and a maximum quantity of ACK/NACK bits for each component carrier, of the component carriers.

In a fourth aspect, alone or in combination with one or more of the first through third aspects, receiving the configuration includes receiving a pre-configuration when the UE being outside of a coverage of a network or a configuration when the UE being within the coverage of the network.

In a fifth aspect, alone or in combination with one or more of the first through fourth aspects, one or more of the first component carrier or the second component carrier is associated with an unlicensed spectrum, and wherein the third component carrier is associated with a licensed spectrum.

In a sixth aspect, alone or in combination with one or more of the first through fifth aspects, one or more of the first component carrier or the second component carrier is associated with a first operating band, and wherein the third component carrier is associated with a second operating band that is different from the first operating band.

In a seventh aspect, alone or in combination with one or more of the first through sixth aspects, the first operating band is associated with a frequency range from 24.25 GHz through 52.6 GHz and the second operating band is associated with a frequency range from 410 MHz through 7.125 GHz.

In an eighth aspect, alone or in combination with one or more of the first through seventh aspects, the one or more parameters are associated with the PSFCH comprising two symbols.

In a ninth aspect, alone or in combination with one or more of the first through eighth aspects, the one or more parameters include one or more of a first parameter indicating that the third component carrier is to be used for transmitting the cross-carrier feedback, a second parameter indicating a quantity of symbols to be used for transmitting the cross-carrier feedback, a third parameter indicating a total quantity of the component carriers using cross carrier feedback, or a fourth parameter indicating a total quantity of ACK/NACK bits to be aggregated for each of the component carriers.

In a tenth aspect, alone or in combination with one or more of the first through ninth aspects, the configuration indicates one or more selected component carriers and one or more activated component carriers, wherein the one or more activated component carriers are included in the one or more selected component carriers.

In an eleventh aspect, alone or in combination with one or more of the first through tenth aspects, the configuration indicates one or more selected parameter values for the one or more parameters and one or more activated parameter values, wherein the one or more activated parameter values are included in the one or more selected parameter values.

In a twelfth aspect, alone or in combination with one or more of the first through eleventh aspects, the configuration is included in a MAC-CE transmitted via a PC5 interface.

In a thirteenth aspect, alone or in combination with one or more of the first through twelfth aspects, the PSFCH comprises a two symbol PSFCH with a quantity of PRBs for aggregating ACK/NACK bits for different component carriers mapped within a sidelink slot.

In a fourteenth aspect, alone or in combination with one or more of the first through thirteenth aspects, the cross-carrier feedback is transmitted using a last two symbols occurring, in time, before a guard symbol at an end of a sidelink slot.

In a fifteenth aspect, alone or in combination with one or more of the first through fourteenth aspects, the cross-carrier feedback is transmitted using a series of symbols, and wherein a first symbol, of the series of symbols, immediately follows, in time, a guard symbol included in a sidelink slot.

In a sixteenth aspect, alone or in combination with one or more of the first through fifteenth aspects, the cross-carrier feedback includes an automatic gain control symbol.

In a seventeenth aspect, alone or in combination with one or more of the first through sixteenth aspects, a portion of the cross-carrier feedback is transmitted using the automatic gain control symbol.

In an eighteenth aspect, alone or in combination with one or more of the first through seventeenth aspects, the cross-carrier feedback has a variable size, and wherein the variable size is based at least in part on a quantity of the component carriers.

In a nineteenth aspect, alone or in combination with one or more of the first through eighteenth aspects, the cross-carrier feedback includes a group of fields, and wherein each field, of the group of fields, is associated with a respective component carrier of the component carriers.

In a twentieth aspect, alone or in combination with one or more of the first through nineteenth aspects, an order of fields included in the group of fields corresponds to an order of transmission blocks received by the UE.

In a twenty-first aspect, alone or in combination with one or more of the first through twentieth aspects, when two or more transmission blocks, of the transmission blocks received by the UE, are received via a same time resource, an order of fields associated with the two or more transmission blocks is based at least in part on an order associated with the component carriers.

In a twenty-second aspect, alone or in combination with one or more of the first through twenty-first aspects, the order associated with the component carriers is based at least in part on a respective component carrier index associated with each of the component carriers.

In a twenty-third aspect, alone or in combination with one or more of the first through twenty-second aspects, a field, of the group of fields, contains a quantity of bits indicating a component carrier associated with the field and one ACK/NACK bit.

In a twenty-fourth aspect, alone or in combination with one or more of the first through twenty-third aspects, a field, of the group of fields, contains a quantity of bits indicating a component carrier associated with the field and a quantity of ACK/NACK bits, and wherein the quantity of ACK/NACK bits are associated with CBG-based feedback.

In a twenty-fifth aspect, alone or in combination with one or more of the first through twenty-fourth aspects, a size of the cross-carrier feedback is a variable size that is based at least in part on a total quantity of ACK/NACK bits included in the cross-carrier feedback multiplied by a sum of one plus a log base 2 of M, wherein M corresponds to a quantity of the component carriers.

In a twenty-sixth aspect, alone or in combination with one or more of the first through twenty-fifth aspects, a size of the cross-carrier feedback is a variable size that is based at least in part on a total quantity of ACK/NACK bits included in the cross-carrier feedback multiplied by a sum of K plus a log base 2 of M, wherein K corresponds to a quantity of bits associated with CBG-based feedback and M corresponds to a quantity of the component carriers.

In a twenty-seventh aspect, alone or in combination with one or more of the first through twenty-sixth aspects, the cross-carrier feedback includes a fixed-size bitmap that contains a quantity of fields for mapping the component carriers.

In a twenty-eighth aspect, alone or in combination with one or more of the first through twenty-seventh aspects, the cross-carrier feedback includes a variable size bitmap, wherein the variable size bitmap contains a quantity of fields corresponding to a quantity of the component carriers.

In a twenty-ninth aspect, alone or in combination with one or more of the first through twenty-eighth aspects, an order of the quantity of fields within a sidelink slot corresponds to an order of the component carriers.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
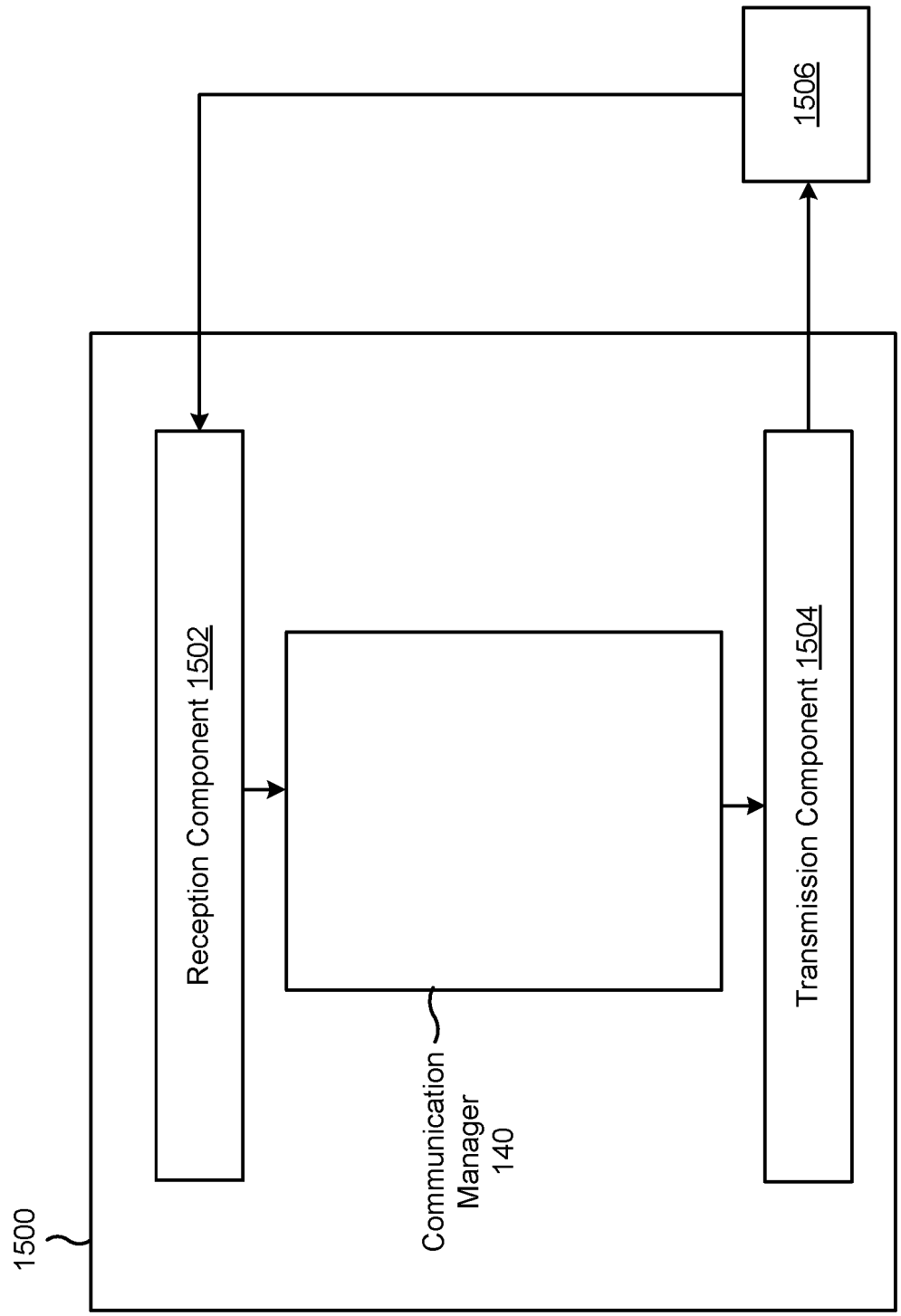
FIGS. 15 and 16 are diagrams of example apparatuses for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140.

In some aspects, the apparatus 1500 may be configured to perform one or more operations described herein in connection with FIGS. 6-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive a configuration, wherein the configuration indicates component carriers for sidelink carrier aggregation and one or more parameters associated with cross-carrier feedback, and wherein the component carriers include a first component carrier, a second component carrier, and a third component carrier. The reception component 1502 may receive a first transmission block on the first component carrier and a second transmission block on the second component carrier. The transmission component 1504 may transmit a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

The number and arrangement of components shown in FIG. 15 are provided as an example. In practice, there may be additional components, fewer components, different components, or differently arranged components than those shown in FIG. 15.

Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
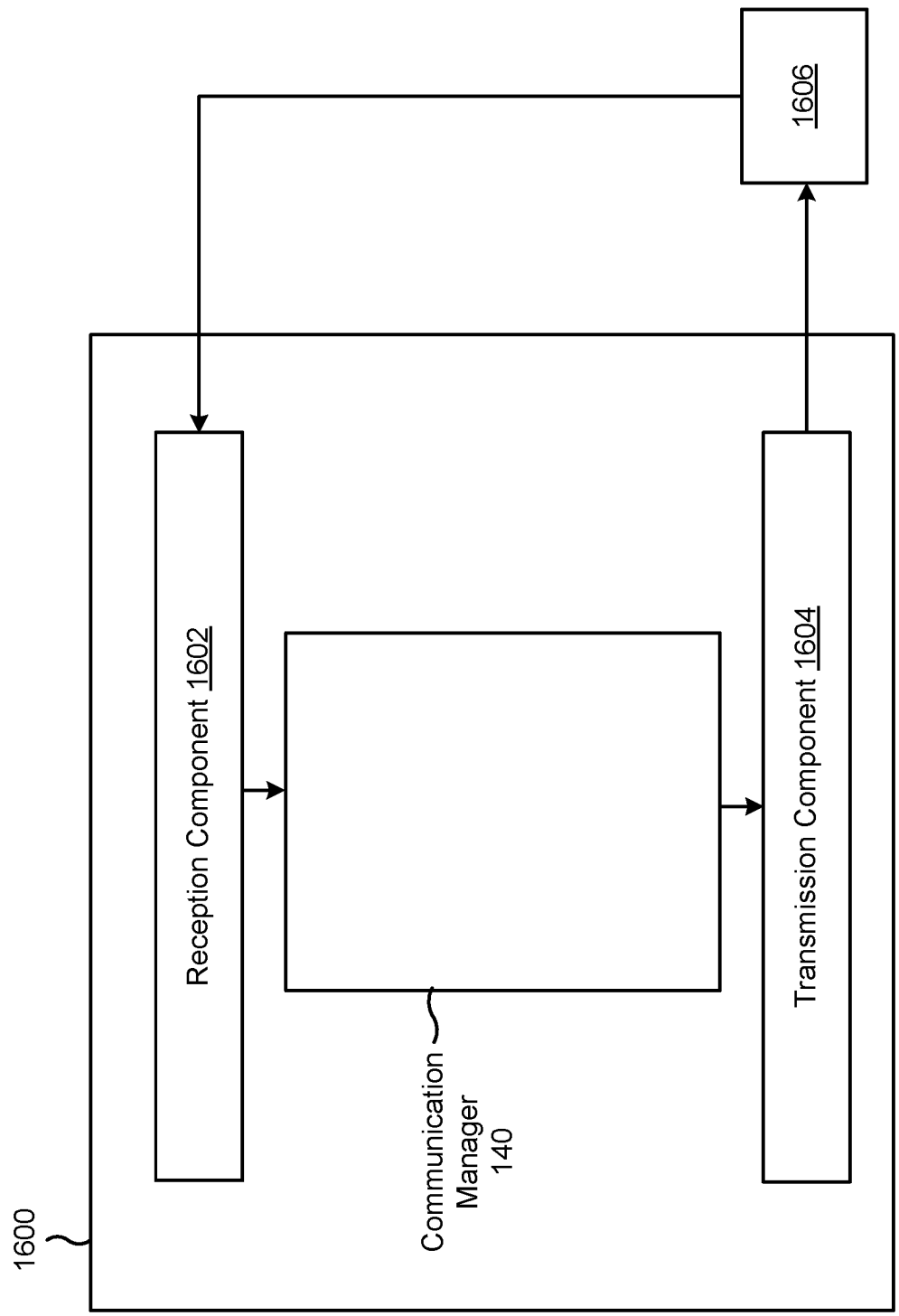

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140.

In some aspects, the apparatus 1600 may be configured to perform one or more operations described herein in connection with FIGS. 6-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive a configuration, wherein the configuration indicates component carriers for sidelink carrier aggregation and one or more parameters associated with cross-carrier feedback, and wherein the component carriers include a first component carrier, a second component carrier, and a third component carrier. The transmission component 1604 may transmit a first transmission block on the first component carrier and a second transmission block on the second component carrier. The reception component 1602 may receive a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

The number and arrangement of components shown in FIG. 16 are provided as an example. In practice, there may be additional components, fewer components, different components, or differently arranged components than those shown in FIG. 16.

Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a UE, comprising: receiving a configuration, wherein the configuration indicates component carriers for sidelink carrier aggregation and one or more parameters associated with cross-carrier feedback, and wherein the component carriers include a first component carrier, a second component carrier, and a third component carrier; receiving a first transmission block on the first component carrier and a second transmission block on the second component carrier; and transmitting a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Aspect 2: The method of Aspect 1, wherein the set of ACK/NACK bits includes a first ACK/NACK bit indicating a first positive acknowledgment or a first negative acknowledgment associated with receiving the first transmission block and a second ACK/NACK bit indicating a second positive acknowledgment or a second negative acknowledgment associated with receiving the second transmission block.

Aspect 3: The method of Aspect 2, wherein the indication of the association between each ACK/NACK bit, of the set of ACK/NACK bits, and the corresponding one of the first component carrier, the second component carrier, the first transmission block, or the second transmission block includes a first indication and a second indication, wherein the first indication indicates an association between the first ACK/NACK bit and the first component carrier or an association between the first ACK/NACK bit and the first transmission block, and wherein the second indication indicates an association between the second ACK/NACK bit and the second component carrier or an association between the second ACK/NACK bit and the second transmission block.

Aspect 4: The method of one or more of Aspects 1 through 3, wherein the configuration indicates that the cross-carrier feedback is transmitted on the third component carrier, a total quantity of the component carriers, and a maximum quantity of ACK/NACK bits for each component carrier, of the component carriers.

Aspect 5: The method of one or more of Aspects 1 through 4, wherein receiving the configuration includes: receiving a pre-configuration when the UE being outside of a coverage of a network or a configuration when the UE being within the coverage of the network.

Aspect 6: The method of one or more of Aspects 1 through 5, wherein one or more of the first component carrier or the second component carrier is associated with an unlicensed spectrum, and wherein the third component carrier is associated with a licensed spectrum.

Aspect 7: The method of one or more of Aspects 1 through 6, wherein one or more of the first component carrier or the second component carrier is associated with a first operating band, and wherein the third component carrier is associated with a second operating band that is different from the first operating band.

Aspect 8: The method of Aspect 7, wherein the first operating band is associated with a frequency range from 24.25 GHz through 52.6 GHz and the second operating band is associated with a frequency range from 410 MHz through 7.125 GHz.

Aspect 9: The method of one or more of Aspects 1 through 8, wherein the one or more parameters are associated with the PSFCH comprising two symbols.

Aspect 10: The method of one or more of Aspects 1 through 9, wherein the one or more parameters include one or more of: a first parameter indicating that the third component carrier is to be used for transmitting the cross-carrier feedback, a second parameter indicating a quantity of symbols to be used for transmitting the cross-carrier feedback, a third parameter indicating a total quantity of the component carriers using cross carrier feedback, or a fourth parameter indicating a total quantity of ACK/NACK bits to be aggregated for each of the component carriers.

Aspect 11: The method of one or more of Aspects 1 through 10, wherein the configuration indicates one or more selected component carriers and one or more activated component carriers, wherein the one or more activated component carriers are included in the one or more selected component carriers.

Aspect 12: The method of one or more of Aspects 1 through 12, wherein the configuration indicates one or more selected parameter values for the one or more parameters and one or more activated parameter values, wherein the one or more activated parameter values are included in the one or more selected parameter values.

Aspect 13: The method of one or more of Aspects 1 through 12, wherein the configuration is included in a MAC-CE transmitted via a PC5 interface.

Aspect 14: The method of one or more of Aspects 1 through 13, wherein the PSFCH comprises a two symbol PSFCH with a quantity of PRBs for aggregating ACK/NACK bits for different component carriers mapped within a sidelink slot.

Aspect 15: The method of one or more of Aspects 1 through 14, wherein the cross-carrier feedback is transmitted using a last two symbols occurring, in time, before a guard symbol at an end of a sidelink slot.

Aspect 16: The method of one or more of Aspects 1 through 15, wherein the cross-carrier feedback is transmitted using a series of symbols, and wherein a first symbol, of the series of symbols, immediately follows, in time, a guard symbol included in a sidelink slot.

Aspect 17: The method of one or more of Aspects 1 through 16, wherein the cross-carrier feedback includes an automatic gain control symbol.

Aspect 18: The method of Aspect 17, wherein a portion of the cross-carrier feedback is transmitted using the automatic gain control symbol.

Aspect 19: The method of one or more of Aspects 1 through 18, wherein the cross-carrier feedback has a variable size, and wherein the variable size is based at least in part on a quantity of the component carriers.

Aspect 20: The method of one or more of Aspects 1 through 19, wherein the cross-carrier feedback includes a group of fields, and wherein each field, of the group of fields, is associated with a respective component carrier of the component carriers.

Aspect 21: The method of Aspect 20, wherein an order of fields included in the group of fields corresponds to an order of transmission blocks received by the UE.

Aspect 22: The method of Aspect 21, wherein, when two or more transmission blocks, of the transmission blocks received by the UE, are received via a same time resource, an order of fields associated with the two or more transmission blocks is based at least in part on an order associated with the component carriers.

Aspect 23: The method of Aspect 22, wherein the order associated with the component carriers is based at least in part on a respective component carrier index associated with each of the component carriers.

Aspect 24: The method of Aspect 20, wherein a field, of the group of fields, contains a quantity of bits indicating a component carrier associated with the field and one ACK/NACK bit.

Aspect 25: The method of Aspect 20, wherein a field, of the group of fields, contains a quantity of bits indicating a component carrier associated with the field and a quantity of ACK/NACK bits, and wherein the quantity of ACK/NACK bits are associated with CBG-based feedback.

Aspect 26: The method of one or more of Aspects 1 through 25, wherein a size of the cross-carrier feedback is a variable size that is based at least in part on a total quantity of ACK/NACK bits included in the cross-carrier feedback multiplied by a sum of one plus a log base 2 of M, wherein M corresponds to a quantity of the component carriers.

Aspect 27: The method of one or more of Aspects 1 through 26, wherein a size of the cross-carrier feedback is a variable size that is based at least in part on a total quantity of ACK/NACK bits included in the cross-carrier feedback multiplied by a sum of K plus a log base 2 of M, wherein K corresponds to a quantity of bits associated with CBG-based feedback and M corresponds to a quantity of the component carriers.

Aspect 28: The method of one or more of Aspects 1 through 27, wherein the cross-carrier feedback includes a fixed-size bitmap that contains a quantity of fields for mapping the component carriers.

Aspect 29: The method of one or more of Aspects 1 through 28, wherein the cross-carrier feedback includes a variable size bitmap, wherein the variable size bitmap contains a quantity of fields corresponding to a quantity of the component carriers.

Aspect 30: The method of Aspect 29, wherein an order of the quantity of fields within a sidelink slot corresponds to an order of the component carriers.

Aspect 31: A method of wireless communication performed by a UE, comprising: receiving a configuration, wherein the configuration indicates component carriers for sidelink carrier aggregation and one or more parameters associated with cross-carrier feedback, and wherein the component carriers include a first component carrier, a second component carrier, and a third component carrier; transmitting a first transmission block on the first component carrier and a second transmission block on the second component carrier; and receiving a PSFCH on the third component carrier with the cross-carrier feedback, wherein the cross-carrier feedback includes a set of ACK/NACK bits and an indication of an association between each ACK/NACK bit, of the set of ACK/NACK bits, and a corresponding one of the first component carrier, the second component carrier, the first transmission block, or the second transmission block.

Aspect 32: The method of Aspect 31, wherein the set of ACK/NACK bits includes a first ACK/NACK bit indicating a first positive acknowledgment or a first negative acknowledgment associated with receiving the first transmission block and a second ACK/NACK bit indicating a second positive acknowledgment or a second negative acknowledgment associated with receiving the second transmission block.

Aspect 33: The method of Aspect 32, wherein the indication of the association between each ACK/NACK bit, of the set of ACK/NACK bits, and the corresponding one of the first component carrier, the second component carrier, the first transmission block, or the second transmission block includes a first indication and a second indication, wherein the first indication indicates an association between the first ACK/NACK bit and the first component carrier or an association between the first ACK/NACK bit and the first transmission block, and wherein the second indication indicates an association between the second ACK/NACK bit and the second component carrier or an association between the second ACK/NACK bit and the second transmission block.

Aspect 34: The method of one or more of Aspects 31 through 33, wherein the configuration indicates that the cross-carrier feedback is transmitted on the third component carrier, a total quantity of the component carriers, and a maximum quantity of ACK/NACK bits for each component carrier, of the component carriers.

Aspect 35: The method of one or more of Aspects 31 through 34, wherein receiving the configuration includes: receiving a pre-configuration when the UE being outside of a coverage of a network or a configuration when the UE being within the coverage of the network.

Aspect 36: The method of one or more of Aspects 31 through 35, wherein one or more of the first component carrier or the second component carrier is associated with an unlicensed spectrum, and wherein the third component carrier is associated with a licensed spectrum.

Aspect 37: The method of one or more of Aspects 31 through 36, wherein one or more of the first component carrier or the second component carrier is associated with a first operating band, and wherein the third component carrier is associated with a second operating band that is different from the first operating band.

Aspect 38: The method of Aspect 37, wherein the first operating band is associated with a frequency range from 24.25 GHz through 52.6 GHz and the second operating band is associated with a frequency range from 410 MHz through 7.125 GHz.

Aspect 39: The method of one or more of Aspects 31 through 38, wherein the one or more parameters are associated with the PSFCH comprising two symbols.

Aspect 40: The method of one or more of Aspects 31 through 39, wherein the one or more parameters include one or more of: a first parameter indicating that the third component carrier is to be used for transmitting the cross-carrier feedback, a second parameter indicating a quantity of symbols to be used for transmitting the cross-carrier feedback, a third parameter indicating a total quantity of the component carriers using cross carrier feedback, or a fourth parameter indicating a total quantity of ACK/NACK bits to be aggregated for each of the component carriers.

Aspect 41: The method of one or more of Aspects 31 through 40, wherein the configuration indicates one or more selected component carriers and one or more activated component carriers, wherein the one or more activated component carriers are included in the one or more selected component carriers.

Aspect 42: The method of one or more of Aspects 31 through 41, wherein the configuration indicates one or more selected parameter values for the one or more parameters and one or more activated parameter values, wherein the one or more activated parameter values are included in the one or more selected parameter values.

Aspect 43: The method of one or more of Aspects 31 through 42, wherein the configuration is included in a MAC-CE transmitted via a PC5 interface.

Aspect 44: The method of one or more of Aspects 31 through 43, wherein the PSFCH comprises a two symbol PSFCH with a quantity of PRBs for aggregating ACK/NACK bits for different component carriers mapped within a sidelink slot.

Aspect 45: The method of one or more of Aspects 31 through 44, wherein the cross-carrier feedback is transmitted using a last two symbols occurring, in time, before a guard symbol at an end of a sidelink slot.

Aspect 46: The method of one or more of Aspects 31 through 45, wherein the cross-carrier feedback is transmitted using a series of symbols, and wherein a first symbol, of the series of symbols, immediately follows, in time, a guard symbol included in a sidelink slot.

Aspect 47: The method of one or more of Aspects 31 through 46, wherein the cross-carrier feedback includes an automatic gain control symbol.

Aspect 48: The method of Aspect 47, wherein a portion of the cross-carrier feedback is transmitted using the automatic gain control symbol.

Aspect 49: The method of one or more of Aspects 31 through 48, wherein the cross-carrier feedback has a variable size, and wherein the variable size is based at least in part on a quantity of the component carriers.

Aspect 50: The method of one or more of Aspects 31 through 49, wherein the cross-carrier feedback includes a group of fields, and wherein each field, of the group of fields, is associated with a respective component carrier of the component carriers.

Aspect 51: The method of Aspect 50, wherein an order of fields included in the group of fields corresponds to an order of transmission blocks received by the UE.

Aspect 52: The method of Aspect 51, wherein, when two or more transmission blocks, of the transmission blocks received by the UE, are received via a same time resource, an order of fields associated with the two or more transmission blocks is based at least in part on an order associated with the component carriers.

Aspect 53: The method of Aspect 52, wherein the order associated with the component carriers is based at least in part on a respective component carrier index associated with each of the component carriers.

Aspect 54: The method of Aspect 50, wherein a field, of the group of fields, contains a quantity of bits indicating a component carrier associated with the field and one ACK/NACK bit.

Aspect 55: The method of Aspect 50, wherein a field, of the group of fields, contains a quantity of bits indicating a component carrier associated with the field and a quantity of ACK/NACK bits, and wherein the quantity of ACK/NACK bits are associated with CBG-based feedback.

Aspect 56: The method of one or more of Aspects 31 through 55, wherein a size of the cross-carrier feedback is a variable size that is based at least in part on a total quantity of ACK/NACK bits included in the cross-carrier feedback multiplied by a sum of one plus a log base 2 of M, wherein M corresponds to a quantity of the component carriers.

Aspect 57: The method of one or more of Aspects 31 through 56, wherein a size of the cross-carrier feedback is a variable size that is based at least in part on a total quantity of ACK/NACK bits included in the cross-carrier feedback multiplied by a sum of K plus a log base 2 of M, wherein K corresponds to a quantity of bits associated with CBG-based feedback and M corresponds to a quantity of the component carriers.

Aspect 58: The method of one or more of Aspects 31 through 57, wherein the cross-carrier feedback includes a fixed-size bitmap that contains a quantity of fields for mapping the component carriers.

Aspect 59: The method of one or more of Aspects 31 through 58, wherein the cross-carrier feedback includes a variable size bitmap, wherein the variable size bitmap contains a quantity of fields corresponding to a quantity of the component carriers.

Aspect 60: The method of Aspect 59, wherein an order of the quantity of fields within a sidelink slot corresponds to an order of the component carriers.

Aspect 61: An apparatus for wireless communication at a device, comprising a processor; memory coupled with the processor; and instructions stored in the memory and executable by the processor to cause the apparatus to perform the method of one or more of Aspects 1 through 30.

Aspect 62: A device for wireless communication, comprising a memory and one or more processors coupled to the memory, the one or more processors configured to perform the method of one or more of Aspects 1 through 30.

Aspect 63: An apparatus for wireless communication, comprising at least one means for performing the method of one or more of Aspects 1 through 30.

Aspect 64: A non-transitory computer-readable medium storing code for wireless communication, the code comprising instructions executable by a processor to perform the method of one or more of Aspects 1 through 30.

Aspect 65: A non-transitory computer-readable medium storing a set of instructions for wireless communication, the set of instructions comprising one or more instructions that, when executed by one or more processors of a device, cause the device to perform the method of one or more of Aspects 1 through 30.

Aspect 66: An apparatus for wireless communication at a device, comprising a processor; memory coupled with the processor; and instructions stored in the memory and executable by the processor to cause the apparatus to perform the method of one or more of Aspects 31 through 60.

Aspect 67: A device for wireless communication, comprising a memory and one or more processors coupled to the memory, the one or more processors configured to perform the method of one or more of Aspects 31 through 60.

Aspect 68: An apparatus for wireless communication, comprising at least one means for performing the method of one or more of Aspects 31 through 60.

Aspect 69: A non-transitory computer-readable medium storing code for wireless communication, the code comprising instructions executable by a processor to perform the method of one or more of Aspects 31 through 60.

Aspect 70: A non-transitory computer-readable medium storing a set of instructions for wireless communication, the set of instructions comprising one or more instructions that, when executed by one or more processors of a device, cause the device to perform the method of one or more of Aspects 31 through 60.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a processing system that includes processor circuitry and memory circuitry that stores code, the processing system configured to cause the apparatus to:
   receive a configuration, the configuration indicating a set of component carriers for carrier aggregation and one or more parameters associated with cross-carrier feedback, the set of component carriers including a first component carrier and a second component carrier, wherein a size of the cross-carrier feedback is a variable size corresponding to a total quantity of acknowledgement/negative acknowledgement (ACK/NACK) bits included in the cross-carrier feedback multiplied by:
     (i) log base 2 of a quantity of the set of component carriers plus one, or
     (ii) log base 2 of the quantity of the set of component carriers plus K, K corresponding to a quantity of bits associated with code block group (CBG)-based feedback;
   receive a first transmission block on the first component carrier, and a second transmission block on the second component carrier; and
   transmit the cross-carrier feedback on a physical sidelink feedback channel (PSFCH), the cross-carrier feedback including a set of ACK/NACK bits and an indication of an association between each ACK/NACK bit, of the set of ACK/NACK bits, and a corresponding one of the first component carrier, the second component carrier, the first transmission block, or the second transmission block.

2. The apparatus of claim 1, wherein the set of ACK/NACK bits includes a first ACK/NACK bit indicating a first positive acknowledgment or a first negative acknowledgment associated with receiving the first transmission block and a second ACK/NACK bit indicating a second positive acknowledgment or a second negative acknowledgment associated with receiving the second transmission block.

3. The apparatus of claim 2, wherein the indication of the association between each ACK/NACK bit, of the set of ACK/NACK bits, and the corresponding one of the first component carrier, the second component carrier, the first transmission block, or the second transmission block includes a first indication and a second indication.

4. The apparatus of claim 1, wherein the configuration indicates a total quantity of the set of component carriers, or a maximum quantity of ACK/NACK bits for each component carrier, of the set of component carriers.

5. The apparatus of claim 1, wherein the processing system, to receive the configuration, is configured to:
   receive a pre-configuration when the UE is outside of a coverage of a network, or
   receive a configuration when the UE is within the coverage of the network.

6. The apparatus of claim 1, wherein the configuration indicates that the cross-carrier feedback is transmitted on a third component carrier, one or more of the first component carrier or the second component carrier being associated with an unlicensed spectrum, and the third component carrier being associated with a licensed spectrum.

7. The apparatus of claim 1, wherein the set of component carriers includes a third component carrier, one or more of the first component carrier or the second component carrier being associated with a first operating band, the third component carrier being associated with a second operating band that is different from the first operating band, and the first operating band being associated with a frequency range from 24.25 GHz through 52.6 GHz and the second operating band being associated with a frequency range from 410 MHz through 7.125 GHz.

8. The apparatus of claim 1, wherein the set of component carriers includes a third component carrier, the one or more parameters including one or more of:
   a first parameter indicating that the third component carrier is to be used for transmitting the cross-carrier feedback,
   a second parameter indicating a quantity of symbols to be used for transmitting the cross-carrier feedback,
   a third parameter indicating the quantity of the set of component carriers, or
   a fourth parameter indicating a total quantity of ACK/NACK bits to be aggregated for each of the set of component carriers.

9. The apparatus of claim 1, wherein the PSFCH comprises a two symbol PSFCH with a quantity of physical resource blocks (PRBs) for aggregating ACK/NACK bits for different component carriers, of the set of component carriers, mapped within a sidelink slot.

10. The apparatus of claim 1, wherein the cross-carrier feedback is transmitted using a last two symbols occurring, in time, before a guard symbol at an end of a sidelink slot.

11. The apparatus of claim 1, wherein the cross-carrier feedback is transmitted using a series of symbols, a first symbol, of the series of symbols, immediately following, in time, a guard symbol included in a sidelink slot.

12. The apparatus of claim 1, wherein the cross-carrier feedback includes an automatic gain control symbol, a portion of the cross-carrier feedback transmitted using the automatic gain control symbol.

13. The apparatus of claim 1, wherein the cross-carrier feedback includes a group of fields, each field, of the group of fields, associated with a respective component carrier of the set of component carriers, and an order of fields included in the group of fields corresponding to an order of transmission blocks received by the UE.

14. The apparatus of claim 13, wherein, when two or more transmission blocks, of the transmission blocks received by the UE, are received via a same time resource, an order of fields associated with the two or more transmission blocks corresponds to an order associated with the set of component carriers.

15. The apparatus of claim 13, wherein a field, of the group of fields, contains a set of bits indicating a component carrier, of the set of component carriers, associated with the field and one ACK/NACK bit.

16. The apparatus of claim 13, wherein a field, of the group of fields, contains a set of bits indicating a component carrier, of the set of component carriers, associated with the field and a quantity of ACK/NACK bits, the quantity of ACK/NACK bits associated with the CBG-based feedback.

17. The apparatus of claim 1, wherein the cross-carrier feedback includes a fixed-size bitmap that contains a quantity of fields for mapping the set of component carriers.

18. The apparatus of claim 1, wherein the cross-carrier feedback includes a variable size bitmap, the variable size bitmap comprising a quantity of fields corresponding to the quantity of the set of component carriers.

19. The apparatus of claim 18, wherein an order of the quantity of fields within a sidelink slot corresponds to an order of the set of component carriers.

20. The apparatus of claim 1, wherein the cross-carrier feedback includes feedback sidelink control information (FSCI) bits including:
a first indication of an association between the first component carrier and a plurality of ACK/NACK bits, of the set of ACK/NACK bits, corresponding to the first transmission block and the second transmission block, and
a second indication of an association between the second component carrier and an ACK/NACK bit, of the set of ACK/NACK bits, corresponding to a third transmission block.

21. An apparatus for wireless communication at a user equipment (UE), comprising: a processing system that includes processor circuitry and memory circuitry that stores code, the processing system configured to cause the UE to:
receive a configuration, the configuration indicating a set of component carriers for carrier aggregation and one or more parameters associated with cross-carrier feedback, the set of component carriers including a first component carrier and a second component carrier, wherein a size of the cross-carrier feedback is a variable size corresponding to a total quantity of acknowledgement/negative acknowledgement (ACK/NACK) bits included in the cross-carrier feedback multiplied by:
(i) log base 2 of a quantity of the set of component carriers plus one, or
(ii) log base 2 of the quantity of the set of component carriers plus K, K corresponding to a quantity of bits associated with code block group (CBG)-based feedback;
transmit a first transmission block on the first component carrier, and a second transmission block on the second component carrier; and
receive the cross-carrier feedback on a physical sidelink feedback channel (PSFCH), the cross-carrier feedback including a set of ACK/NACK bits and an indication of an association between each ACK/NACK bit, of the set of ACK/NACK bits, and a corresponding one of the first component carrier, the second component carrier, the first transmission block, or the second transmission block.

22. The apparatus of claim 21, wherein the set of ACK/NACK bits includes a first ACK/NACK bit indicating a first positive acknowledgment or a first negative acknowledgment associated with receiving the first transmission block and a second ACK/NACK bit indicating a second positive acknowledgment or a second negative acknowledgment associated with receiving the second transmission block.

23. The apparatus of claim 22, wherein the indication of the association between each ACK/NACK bit, of the set of ACK/NACK bits, and the corresponding one of the first component carrier, the second component carrier, the first transmission block, or the second transmission block includes a first indication and a second indication.

24. The apparatus of claim 21, wherein the configuration indicates that the cross-carrier feedback is transmitted on a third component carrier, one or more of the first component carrier or the second component carrier being associated with an unlicensed spectrum, and the third component carrier being associated with a licensed spectrum.

25. The apparatus of claim 24, wherein set of component carriers includes a third component carrier, one or more of the first component carrier or the second component carrier being associated with a first operating band, the third component carrier being associated with a second operating band that is different from the first operating band, and the first operating band being associated with a frequency range from 24.25 GHz through 52.6 GHz and the second operating band being associated with a frequency range from 410 MHz through 7.125 GHz.

26. The apparatus of claim 21, wherein the set of component carriers includes a third component carrier, the one or more parameters including one or more of:
a first parameter indicating that the third component carrier is to be used for transmitting the cross-carrier feedback,
a second parameter indicating a quantity of symbols to be used for transmitting the cross-carrier feedback,
a third parameter indicating the quantity of the set of component carriers, or
a fourth parameter indicating a total quantity of ACK/NACK bits to be aggregated for each of the set of component carriers.

27. The apparatus of claim 21, wherein the PSFCH comprises a two symbol PSFCH with a quantity of physical resource blocks (PRBs) for aggregating ACK/NACK bits for different component carriers, of the set of component carriers, mapped within a sidelink slot.

28. The apparatus of claim 21, wherein the cross-carrier feedback is transmitted using a last two symbols occurring, in time, before a guard symbol at an end of a sidelink slot.

29. The apparatus of claim 21, wherein the set of component carriers includes a third component carrier.

30. The apparatus of claim 21, wherein the cross-carrier feedback includes feedback sidelink control information (FSCI) bits including:
a first indication of an association between the first component carrier and a plurality of ACK/NACK bits, of the set of ACK/NACK bits, corresponding to the first transmission block and the second transmission block, and a second indication of an association between the second component carrier and an ACK/NACK bit, of the set of ACK/NACK bits, corresponding to a third transmission block.

* * * * *